(12) United States Patent
Ciotti, Jr. et al.

(10) Patent No.: US 6,421,731 B1
(45) Date of Patent: *Jul. 16, 2002

(54) DYNAMIC NEXT HOP ROUTING PROTOCOL

(75) Inventors: Frank D. Ciotti, Jr., Solon; William E. Beller, Akron; Daniel G. Wall, Uniontown, all of OH (US)

(73) Assignee: Telxon Corporation, Holtsville, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/741,208

(22) Filed: Oct. 29, 1996

(51) Int. Cl.$^7$ .............................................. G06F 15/173
(52) U.S. Cl. ....................................... 709/238; 709/242
(58) Field of Search .............................. 340/825.08, 44; 370/349, 316, 17, 94.1, 85.13, 58, 338, 350, 352; 395/20.12, 200.75, 200.47; 455/427, 461, 436, 517, 432; 709/238, 242, 227, 202, 246, 224, 171

(56) References Cited

U.S. PATENT DOCUMENTS

| | | | | |
|---|---|---|---|---|
| 5,210,787 A | * | 5/1993 | Hayes et al. .................. 379/60 |
| 5,272,638 A | * | 12/1993 | Martin et al. ................ 364/444 |
| 5,412,654 A | * | 5/1995 | Perkins ....................... 370/312 |
| 5,434,994 A | * | 7/1995 | Shaheen et al. ............. 395/500 |
| 5,572,528 A | * | 11/1996 | Shuen ...................... 370/85.13 |
| 5,592,533 A | * | 1/1997 | McHenry et al. ............. 379/58 |
| 5,603,031 A | * | 2/1997 | White et al. ................ 709/171 |
| 5,636,217 A | * | 6/1997 | Moelard ...................... 370/338 |
| 5,673,031 A | * | 9/1997 | Meier ..................... 340/825.08 |
| 5,726,984 A | * | 3/1998 | Kubler et al. ............... 370/349 |
| 5,740,366 A | * | 4/1998 | Mahany et al. ............. 709/227 |
| 5,757,787 A | * | 5/1998 | Eng et al. ................... 370/315 |
| 5,793,976 A | * | 8/1998 | Chen et al. ................. 709/224 |
| 5,822,309 A | * | 10/1998 | Ayanoglu ................... 370/315 |
| 5,841,769 A | * | 11/1998 | Okanoue et al. ............ 370/338 |
| 5,890,054 A | * | 3/1999 | Logsdon et al. ........... 455/11.1 |
| 5,903,840 A | * | 5/1999 | Bertacchi .................... 455/436 |
| 5,940,771 A | * | 8/1999 | Gollnick et al. ............ 455/517 |
| 5,943,334 A | * | 8/1999 | Buskens et al. ............ 370/350 |

OTHER PUBLICATIONS

Router Discovery, http://beyond.malmo.Ith.se/gate/node36.html. Jan./1996.*
RT1100 Pocket RF Terminal, Norand Corp, Dec. 1991.*
Wireless Network I, IEEE Global Comm 95 [p316–360], Nov. 1995.*
Wireless Network II, IEEE Global Comm 95 [p1468–1512], Nov. 1995.*

* cited by examiner

Primary Examiner—Mark H. Rinehart
Assistant Examiner—Thong Vu
(74) Attorney, Agent, or Firm—Amin & Turocy, LLP

(57) ABSTRACT

In a wireless network having a plurality of nodes which roam about the network, a method for routing data packets among the nodes whereby each of the nodes carries out the steps of maintaining a list of nodes which are reachable through the node based on advertisements received from other nodes; advertising to other nodes the list of nodes which are reachable through the node; and when receiving a data packet for which the node is not the ultimate destination, forwarding the data packet towards the ultimate destination based on the list of nodes.

34 Claims, 38 Drawing Sheets

| Node | Hop | Metric | T | RC |
|------|-----|--------|-----|-----|
| 25A | 25A | 1 | t1 | N |
| 25D | 25A | 2 | t2 | N |
| • | • | • | • | • |
| • | • | • | • | • |
| • | • | • | • | • |
| 25E | 25F | 2 | t3 | N |
| 25F | 25F | 1 | t4 | N |

Fig. 2

Node A's Routing Table after sending update

| Node | Hop | Metric | T | RC |
|------|-----|--------|-----|----|
| A | A | 0 | 0 | N |
| B | B | 1 | t1 | N |
| C | C | 1 | t3 | N |

Node B's Routing Table after sending update

| Node | Hop | Metric | T | RC |
|------|-----|--------|-----|----|
| A | A | 1 | t2 | N |
| B | B | 0 | 0 | N |
| C | C | 1 | t3 | N |

Fig. 5e

Node A's Routing Table after sending update

| Node | Hop | Metric | T  | RC |
|------|-----|--------|----|----|
| A    | A   | 0      | 0  | N  |
| B    | B   | 1      | t1 | N  |
| C    | C   | 1      | t3 | N  |
| D    | C   | 16     | d2 | N  |

Node B's Routing Table after sending update

| Node | Hop | Metric | T  | RC |
|------|-----|--------|----|----|
| A    | A   | 1      | t2 | N  |
| B    | B   | 0      | 0  | N  |
| C    | C   | 1      | t3 | N  |
| D    | C   | 16     | d2 | N  |

Fig. 6c

Node A's Routing Table after sending update

| Node | Hop | Metric | T  | RC |
|------|-----|--------|----|----|
| A    | A   | 0      | 0  | N  |
| B    | B   | 1      | t1 | N  |
| C    | C   | 1      | t3 | N  |
| D    | C   | 16     | d2 | N  |
| E    | C   | 2      | t7 | N  |

Node B's Routing Table after sending update

| Node | Hop | Metric | T  | RC |
|------|-----|--------|----|----|
| A    | A   | 1      | t2 | N  |
| B    | B   | 0      | 0  | N  |
| C    | C   | 1      | t3 | N  |
| D    | C   | 16     | d2 | N  |
| E    | C   | 2      | t7 | N  |

Fig. 6h

Node A's Routing Table after sending update

| Node | Hop | Metric | T | RC |
|---|---|---|---|---|
| A | A | 0 | 0 | N |
| B | B | 1 | t1 | N |
| C | C | 1 | t3 | N |
| D | C | 3 | t11 | N |
| E | C | 2 | t7 | N |

Node B's Routing Table after sending update

| Node | Hop | Metric | T | RC |
|---|---|---|---|---|
| A | A | 1 | t2 | N |
| B | B | 0 | 0 | N |
| C | C | 1 | t3 | N |
| D | C | 3 | t11 | N |
| E | C | 2 | t7 | N |

Node D's Routing Table after sending update

| Node | Hop | Metric | T | RC |
|---|---|---|---|---|
| A | E | 3 | t10 | N |
| B | E | 3 | t10 | N |
| C | E | 2 | t10 | N |
| D | D | 0 | 0 | N |
| E | E | 1 | t6 | N |

Fig. 6k

DYNAMIC NEXT HOP ROUTING PROTOCOL

TECHNICAL FIELD

The present invention relates generally to network communications and data routing protocols. More particularly, the present invention relates to a dynamic next hop routing protocol and system for obtaining next hop data link addresses in wireless networks.

BACKGROUND OF THE INVENTION

Wireless communication networks incorporating one or more mobile devices have become increasingly widespread in recent years. Retail stores and warehouses, for example, may use communication networks with mobile data terminals to track inventory and replenish stock. The transportation industry may use such networks at large outdoor storage facilities to keep an accurate account of incoming and outgoing shipments. In manufacturing facilities, such networks are useful for tracking parts, completed products and defects. Such networks are also utilized in cellular telephone communications to allow users with wireless telephones to roam across large geographic regions while retaining telephonic access. Paging networks also utilize mobile communication networks which enable a user carrying a pocket sized pager to be paged anywhere within a geographic region.

Conventional wireless communication networks such as those referred to above typically involve a cellular network. As is known, cellular networks includes a number of fixed access points (also known as base stations) interconnected by a cable medium often referred to as a system backbone. Associated with each access point is a geographic cell. Such cell is a geographic area in which an access point has sufficient signal strength to transmit data to and receive data from a mobile device such as a data terminal or telephone with an acceptable error rate. Typically, access points will be positioned along the backbone such that the combined cell area coverage from each access point provides full coverage of a building or site.

Mobile devices such as telephones, pagers, personal digital assistants (PDAs), data terminals, etc. are designed to be carried throughout the system from cell to cell. Each mobile device is capable of communicating with the system backbone via wireless communications between the mobile device and an access point to which the mobile device is registered. As the mobile device roams from one cell to another, the mobile device will typically deregister with the access point of the previous cell and register with the access point associated with the new cell.

In order to provide sufficient cell area coverage, access points within the cellular communication system typically are distributed at separate physical locations throughout an entire geographical region. Unfortunately, this can lead to high costs since access points are relatively expensive compared to the mobile devices. Also, if an access point fails it can result in an entire cell being "blacked out" from communications with other devices within the network.

In view of shortcomings such as those discussed above, there is a strong need in the art for a mobile communication network and protocol which enables communications between mobile and fixed devices even in the absence of access points. In particular, there is a strong need in the art for a mobile communication network and protocol which provides for mobile devices to serve both as ultimate data sources and destinations, as well as routers for routing data to its destination.

SUMMARY OF THE INVENTION

The present invention provides a network in which mobile devices themselves serve as routers of data packets. Each mobile device represents a node in the network. The nodes advertise a list of nodes which are reachable through their interface(s). When a node receives a data packet for which it is not the ultimate destination, it looks up a next hop link address from its list of reachable nodes, and forwards the data packet to that address.

According to one aspect of the invention, in a wireless network having a plurality of nodes which roam about the network, a method for routing data packets among the nodes is provided whereby at least one node carries out the steps of: maintaining a list of nodes which are reachable through the node based on communication received from other nodes; and when receiving data for which the node is not the ultimate destination, attempting to forward the data towards the ultimate destination based on the list of nodes.

According to another aspect of the invention, in a wireless network having a plurality of nodes which roam about the network, a method for routing data packets among the nodes is provided whereby each of the nodes carries out the steps of: maintaining a list of nodes which are reachable through the node based on advertisements received from other nodes; advertising to other nodes the list of nodes which are reachable through the node; and when receiving data for which the node is not the ultimate destination, forwarding the data towards the ultimate destination based on the list of nodes.

According to still another aspect of the invention, a method of communicating routing information in a cellular communication system is provided, the method including the steps of: receiving at a first mobile node communication from a second mobile node operating within direct communication range; adding the second mobile node to a routing table maintained by the first mobile node; and transmitting from the first mobile node, for receipt by at least one other mobile node which may be operating within direct communication range of the first mobile node, at least a portion of the routing table including information related to the second mobile node.

According to another aspect of the invention, a mobile node capable of routing information in a cellular communication system is provided, the mobile node including; wireless communication means for communicating information between the mobile node and any other reachable node; means for maintaining a list of nodes which are reachable through the mobile node based on communication wirelessly received from the other nodes; and means for attempting to wirelessly forward data received towards the ultimate destination based on the list of nodes when the mobile node is not the ultimate destination for the data received.

According to yet another aspect of the invention, a network communication system is provided, including; a backbone; a plurality of base stations coupled to the backbone; a plurality of mobile nodes communicating with the backbone via the base stations; wherein at least one of the mobile nodes includes: wireless communication means for communicating information between the mobile node and any other reachable node; means for maintaining a list of nodes which are reachable through the mobile node based on communication wirelessly received from other nodes; and means for attempting to wirelessly forward data received towards the ultimate destination based on the list of nodes when the mobile node is not the ultimate destination for the data received.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 2 is a diagram representing a routing table maintained in each of the network nodes in accordance with the present invention;

FIGS. 5a–5j illustrate an example of a router discovery process in the mobile communication network in accordance with the present invention;

FIGS. 6a–6l illustrate an example of the present invention whereby the mobile communication network adapts for changes in topology among nodes;

DESCRIPTION OF THE PREFERRED EMBODIMENT

Figure 1:
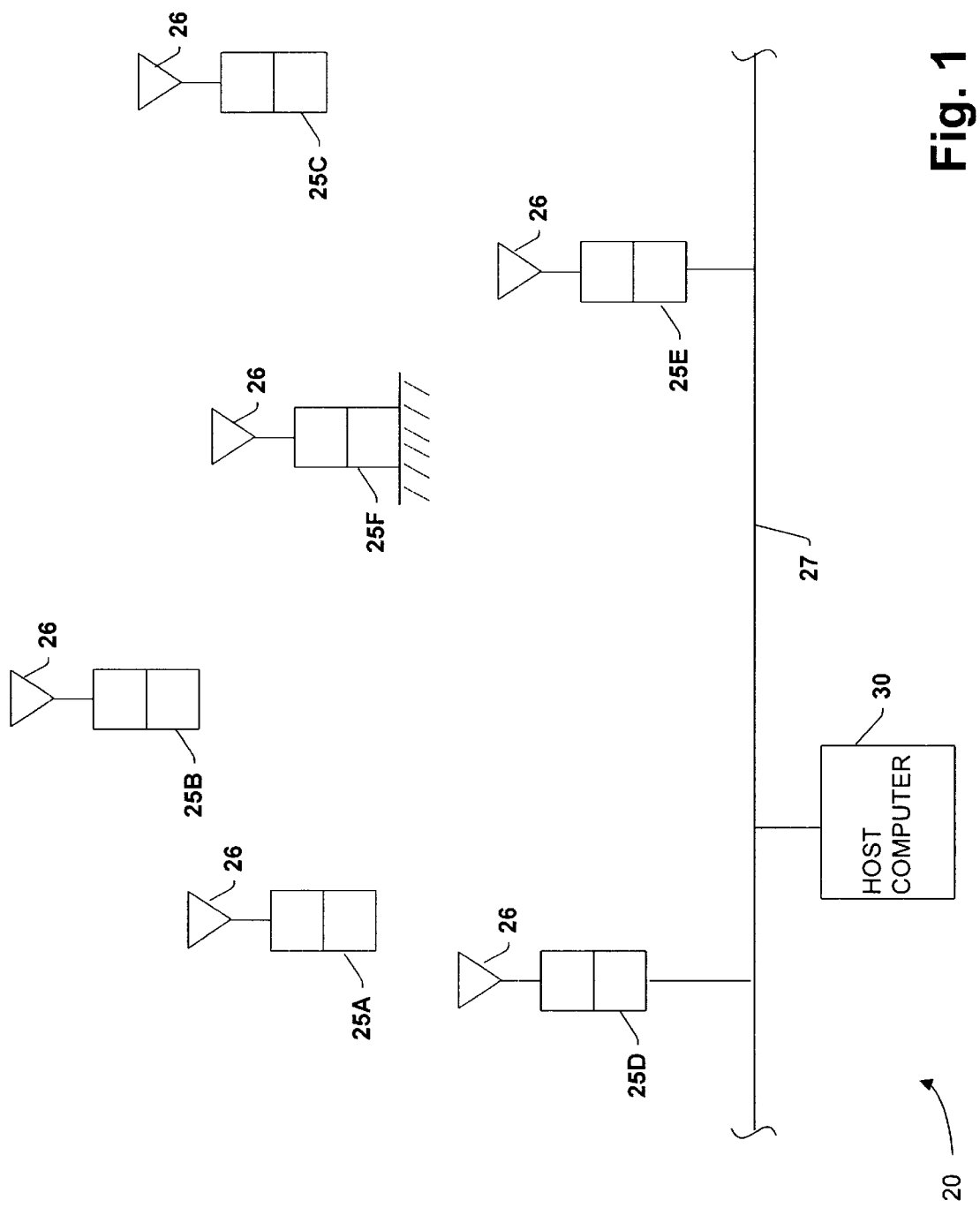
FIG. 1 is a block diagram of a mobile communication network having a plurality of nodes and incorporating a dynamic next hop routing protocol in accordance with the present invention.

The present invention will now be described with reference to the drawings, wherein like reference numerals are used to refer to like elements throughout.

Referring initially to FIG. 1, an exemplary wireless communication network in accordance with the present invention is generally designated as 20. The network 20 includes one or more devices 25, also referred to herein as "nodes". Each node is capable of wirelessly transmitting and receiving information via its respective antenna 26. One or more of the nodes 25 may be mobile devices (e.g., nodes 25A, 25B and 25C) capable of movement throughout a geographical region. The mobile nodes 25A–25C can be devices such as mobile data terminals, wireless telephones, personal pagers, etc. Each is portable and can be carried throughout the geographical region by a user.

The network 20 also includes one or more fixed nodes (e.g., nodes 25D and 25E) which are connected to a hardwired data communication path 27. The hardwired data communication path 27 may be made of twisted pair cable, shielded coaxial cable or fiber optic lines, for instance, and is generally referred to as a system backbone 27. Each of the fixed nodes 25D and 25E also is capable of transmitting and receiving wireless communications involving other nodes 25 via its respective antenna 26. In addition, however, nodes 25D and 25E are able to communicate with other devices connected to the system backbone 27 using conventional network communication techniques. Thus, for example, nodes 25D and 25E are able to communicate with a host computer 30 which is also connected to the system backbone 27. As a result, node 25A for example could also communicate with the host computer 30 through node 25D.

Also included in the network 20 is one or more fixed nodes (e.g., node 25F) which serve primarily as a fixed location repeater station within the network 20. For example, node 25F may serve as a communication link for communications between nodes 25B and 25E. By including fixed nodes within the network 20 that serve as repeaters, for example, it is possible to extend the geographical region of coverage of the network 20 as will be appreciated.

As is described more fully below in connection with FIG. 18, each of the nodes 25 includes a radio or other type of wireless transceiver for wirelessly transmitting and receiving information using conventional techniques. Each of the nodes 25 is controlled by a processor which is programmed based on the flowcharts described herein in order to provide the routing for data packets which are wirelessly transmitted between nodes. Generally speaking, the present invention includes the aspect whereby each of the nodes 25 maintains a routing table which includes a list of other nodes 25 in the network which are reachable through that node. When a subject node 25 receives a data packet for which it is not the ultimate destination, it looks up in its routing table the address of another node 25 which serves as the next hop in a communication link to the ultimate destination. The subject node 25 then forwards the data packet to the next node 25.

Because at least some of the nodes 25 are mobile and their location may change over time, some nodes 25 may lose their respective communication links with other nodes 25 (e.g., such as by going out of range, encountering high noise conditions, etc.). Hence, the routing of information between nodes varies dynamically as existing links between nodes 25 may terminate and new links may be established. The present invention includes a protocol by which routing of data packets is carried out by maintaining in each node dynamic information regarding other nodes which are reachable therethrough. The present invention contemplates that at least one of the nodes 25 in the network 20 is mobile so as to provide optimum advantages. However, it will be appreciated that it is not necessary that any of the nodes 25 be mobile.

FIG. 2 represents a routing table 34 which each node 25 maintains in memory within the network 20. As will be explained in more detail below, the routing table 34 for a subject or given node 25 includes entries for each of the other nodes 25 within the network 20 which are reachable through the subject node 25. Each entry is represented by a row 36 and defines routing information for the corresponding node. For each entry there exists a "Node" field 38 which contains the network identification address (ID) of the particular ultimate destination node 25 corresponding to the entry. In addition, each entry includes a "Hop" field 40 which includes the network ID of the particular node 25 which serves as the next hop (or "neighbor") in a communication link between the subject node 25 and the node 25 identified in the "Node" field 38.

Also included for each entry is a "Metric" field 42. The "Metric" field 42 contains a metric associated with sending a data packet to the node 25 in field 38 via the subject node as discussed more fully below. A timeout field 44 contains a timeout period used to determine whether the corresponding entry has been updated within a predefined period of time. If the timeout period in field 44 expires before the entry is updated, the entry is either marked unusable or is removed from the routing table 34 based on the value in the "Metric" field 42 as is described below in connection with FIG. 14. Finally, each entry in the routing table 34 includes a "Route Change (RC)" field 46 which is set when a new route is added or an existing route is changed. For example, if a new route entry is added to the routing table 34 or an existing route is changed, a route change flag in the RC field 46 is set to "Y". Otherwise, the flag in the RC field 46 is reset to "N". Such information in the RC field 46 is used by the subject node 25 when performing a triggered update as is described more fully below in connection with FIG. 12.

The routing table 34 shown in FIG. 2 may represent, for example, the routing table 34 for node 25B as shown in FIG. 1. The routing table 34 includes entries for nodes 25A, 25D, 25E and 25F which have been found to be reachable either directly or indirectly via node 25B. For example, node 25B can reach node 25A directly as indicated by the entry for node 25A.

Node 25B can reach node 25D via node 25A, and can reach node 25E through node 25F. Finally, the routing table 34 indicates that node 25B can reach node 25F directly. It is noted that the metrics in field 42 for the routes corresponding to nodes 25A and 25F are less than the metrics for the routes corresponding to nodes 25D and 25E since the direct links involve fewer "hops" among nodes and hence typically represent a communication link with a lower "cost".

Figure 3:
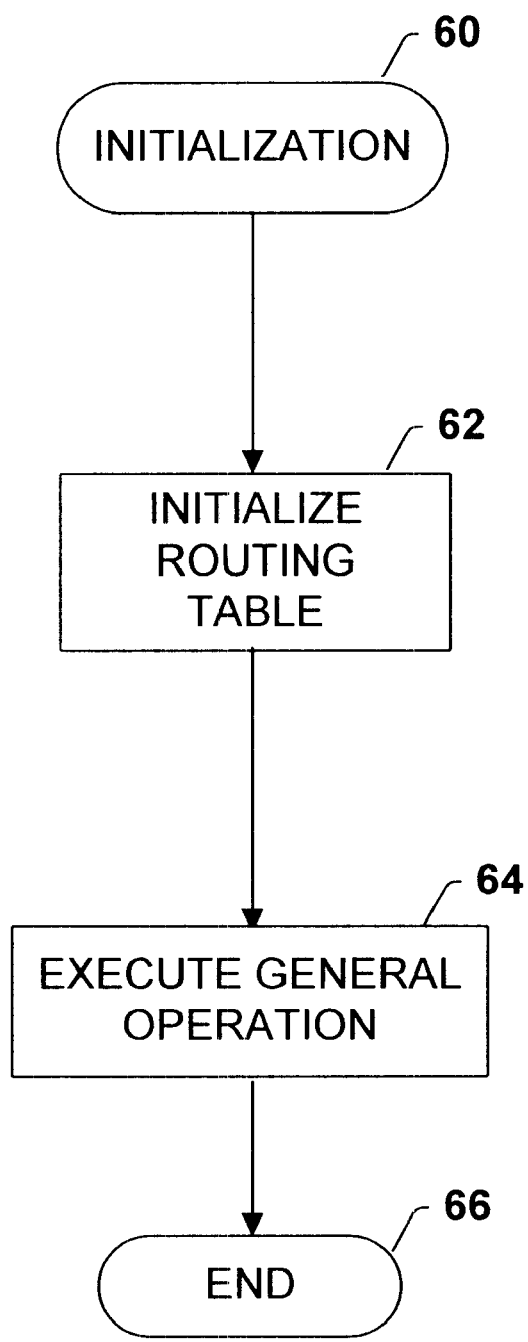
FIG. 3 is a flowchart representing overall operation of each node in the network in accordance with the present invention.

Referring now to FIG. 3, a flowchart is shown which represents the overall operation of each node 25. Specifically, in step 60 a node 25 executes a conventional self-initialization routine upon being powered up. The node 25 then proceeds to step 62 in which it initializes its routing table 34. In particular, the node 25 is programmed to clear its routing table 34. Next, the node 25 proceeds to step 64 in which it carries out primary operation as is described in detail below beginning with FIG. 4. The node 25 remains in step 64 until such time as it is powered down or is otherwise deactivated as represented in step 66.

Figure 4:
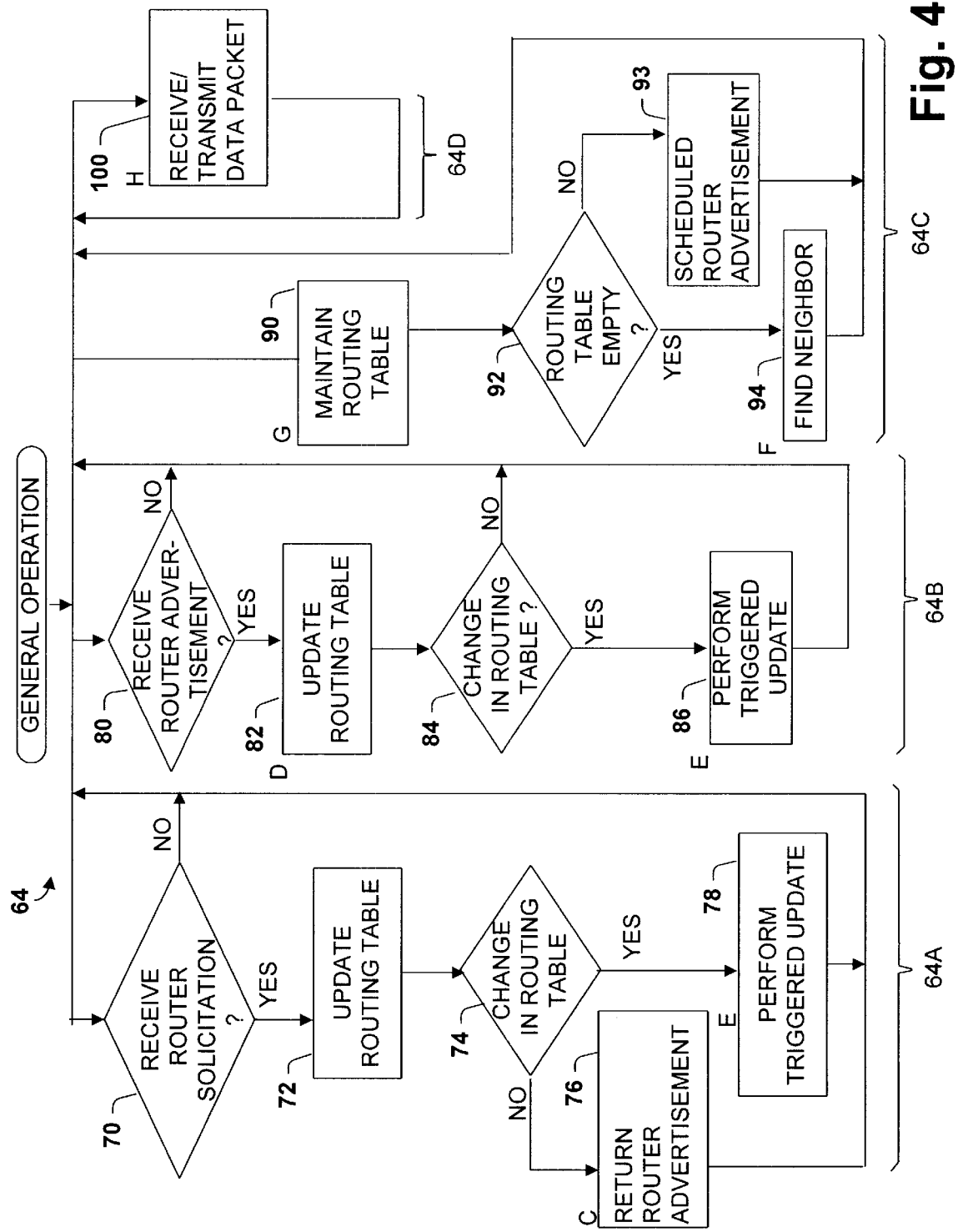
FIG. 4 is a flowchart representing the primary operation of each node in accordance with the present invention.

FIG. 4 is a flowchart representing the primary operation of each node 25 as embodied in step 64 of FIG. 3. The operation can be represented by four different subroutines 64A–64D which are executed by the processor in each respective node 25 substantially simultaneously. Subroutine 64A relates to operations involving responding to router solicitations received from other nodes 25, such router solicitations soliciting information regarding nodes which are reachable through the node. Subroutine 64B involves operations in which a node 25 updates its routing table 34 in response to router advertisements received from other nodes 25. As is discussed below, each node 25 is programmed to transmit a router advertisement periodically and in response to particular events including router solicitations received from other nodes 25. A router advertisement includes information regarding other nodes 25 which are reachable via the node 25 transmitting the router advertisement. Each node 25 utilizes such information to accumulate and update entries in its respective routing table 34. Subroutine 64C involves a node 25 maintaining the contents of its routing table 34. Subroutine 64D relates to the manner in which a node 25 receives and/or transmits data packets from/to other nodes 25.

Referring specifically to subroutine 64A, in step 70 the subject node 25 determines if it has received a router solicitation from another node within the network. An exemplary format of a router solicitation is discussed below in connection with FIG. 8. Generally, all router solicitations are transmitted as multicast packets. A router solicitation is a request for recipient node(s) 25 to send a router advertisement to the source of the router solicitation. The router solicitation may include a request for routing information for one or more specific nodes, or may be simply a request for all routing table entries from the recipient node(s) 25. The subject node 25 effectively loops through step 70 until a router solicitation is received.

Upon receiving a router solicitation as determined in step 70, the subject node 25 proceeds to step 72 in which the node 25 performs a routing table update as is described in detail below in connection with FIG. 11. Since the subject node 25 received the router solicitation, there is known to exist a valid communication link between the source of the router solicitation and the subject node 25. Hence, in step 72 the subject node 25 takes the opportunity to update its routing table 34. This can include adding an entry to the routing table 34 corresponding to the source of the router solicitation. Following step 72, the subject node 25 proceeds to step 74 in which it determines if there has been a change in its routing table. This is determined based on the entries in the RC field 46 of the routing table 34 as described more fully below.

If there is no change as determined in step 74, the node 25 proceeds to step 76 in which it transmits a router advertisement in response to the router solicitation as discussed below in connection with FIG. 10. Generally speaking, the router advertisement in such case is a unicast packet transmitted to the source of the router solicitation identifying routing information for the particular nodes in the routing table of the subject node 25 which can be reached by the subject node 25 and which were identified in the router solicitation. Following step 76, the subject node 25 returns to step 70. If in step 74 it is determined that there has been a change in the routing table as a result of receiving the router solicitation, the node 25 proceeds to step 78. In step 78 the subject node 25 performs what is referred to herein as a triggered update as is described in more detail below referring to FIG. 12. In brief, the triggered update involves the subject node 25 multicasting to any neighboring nodes a router advertisement which includes routing information for those nodes in the routing table 34 whose routing information has changed since the last router advertisement. In addition, the router advertisement includes routing information for those route(s) requested in the router solicitation.

Thus, in subroutine 64A each node 25 responds to router solicitations received from other nodes by transmitting a router advertisement which includes information on the routes requested by the source of the router solicitation. In this manner, nodes 25 are able to educate their neighboring nodes as to which nodes are reachable through that particular node 25.

Turning now to subroutine 64B, in step 80 the subject node 25 determines if a router advertisement has been received from any other nodes 25. Such a router advertisement may be in response to a router solicitation transmitted by the subject node 25. Alternatively, the router advertisement may be as a result of a periodic multicast or triggered update by another node as explained more fully below. If a router advertisement is not received, the subject node 25 will effectively continue to loop through step 80 as shown. Upon receiving a router advertisement as determined in step 80, the node 25 proceeds to step 82 in which it updates the contents of its routing table 34 based on the information included in the router advertisement. As is discussed in more detail below in connection with FIG. 11, the subject node 25 utilizes the routing information included in the received router advertisement to add new routes and/or update existing routes in its routing table. Next, in step 84 the subject node 25 determines if any changes occurred in its routing table 34 based on the route change flags in field 46 of the routing table 34. If no, the node 25 returns to step 80 as shown. If yes, the node 25 proceeds to step 86 in which it carries out a triggered update in the same manner discussed above in connection with step 78.

Thus, the subject node 25 informs its neighbors of any changes in its routing table 34 resulting from a routing advertisement. The neighboring nodes, in turn, update their own respective routing tables 34. Following step 86, the subject node 25 returns to step 80.

Subroutine 64C begins with step 90 in which the subject node 25 maintains its routing table 34 in the manner discussed more fully below in connection with FIG. 14. In general, step 90 involves checking the timeout period in field 44 for each of the routing table entries to determine if the timeout period has expired since the last time the entry was updated. In this manner, communication links which were available at one time but may no longer be available are identified and cleared from the routing table 34. Following step 90, the node 25 proceeds to step 92 in which it determines if its routing table 34 is empty (indicating that no other nodes 25 are known to be reachable via the subject node 25). If the routing table 34 is not empty, the subject node 25 proceeds to step 93 in which it proceeds/continues to carry out a scheduled router advertisement routine in which router advertisements are multicasted periodically by the subject node 25. The scheduled router advertisement routine of step 93 is described more fully below in connection with FIG. 17. Following step 93, the node 25 returns to step 90.

If in step 92 the subject node 25 determines that the routing table 34 is empty, the node 25 does not perform the scheduled periodic router advertisements of step 93. Instead, the node 25 proceeds to step 94 in which it executes a find neighbor routine as is described below in relation to FIG. 13. Briefly, the subject node 25 multicasts a router solicitation to any neighboring nodes 25 which are able to receive the router solicitation. In the router solicitation the subject node 25 requests that any neighboring nodes 25 provide information regarding nodes which are reachable therethrough. In this manner, the subject node 25 can "learn" any neighboring nodes 25 and other nodes 25 reachable therethrough, and other nodes can learn of the subject node. Following step 94, the subject node returns to step 90.

Subroutines 64A–64C deal primarily with routing protocol in accordance with the present invention. Subroutine 64D relates to the receipt/transmission of data packets by the subject node 25 based on the routing protocol. More specifically, subroutine 64D involves the receipt/ transmission of data packets which is carried out by the subject node 25 as part of its ordinary operation within the network 20. For example, if the network 20 is used for keeping track of inventory or the like, such data which is transmitted or received in subroutine 64D may be inventory data sent from one node 25 to another node 25. Subroutine 64D consists primarily of step 100 which is described in detail below in connection with FIGS. 15a–15b. Step 100 involves the routing of data packets among the various nodes based on the routing information acquired in the routing table 34 of the subject node 25 as will be discussed.

Figure 5A:
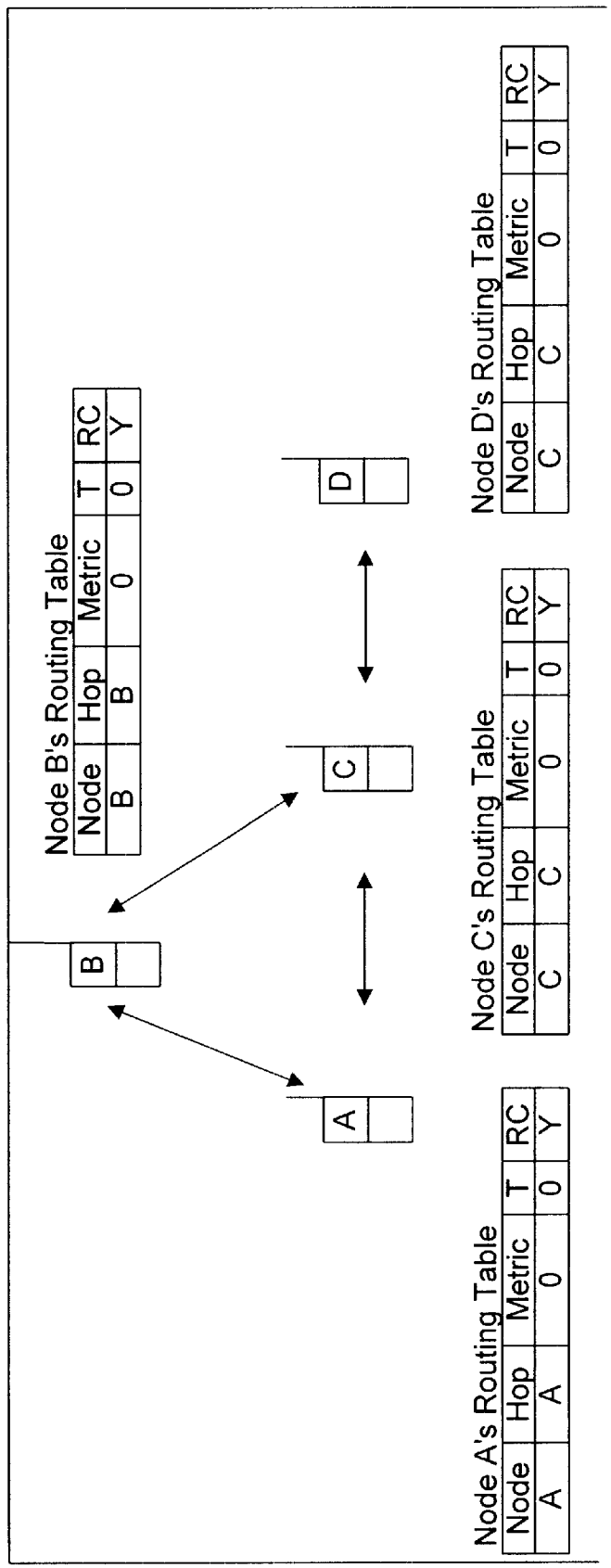

In order to facilitate better understanding of the present invention, it is useful to consider some examples of the operation of the invention based on the general overview provided above. Referring to FIGS. 5a–5j, and initially to FIG. 5a, an example of the manner in which different nodes discover different available routes will now be discussed. FIG. 5a illustrates an example of a network which includes nodes A through D, each of nodes A through D being equivalent to nodes 25 discussed above. Shown in FIG. 5a is the routing table 34 for each of the corresponding nodes. For purpose of clarity, routes for the various nodes themselves (i.e., loop-back routes) are shown in the corresponding routing tables and router advertisements in the following examples. However, these routes are ignored in the actual embodiment in order to reduce data traffic, and hence are shown with a metric value of zero in field 42.

FIG. 5a assumes that a network is formed initially as shown with nodes A through D. All of nodes A through D are assumed to boot up or enter the network at approximately the same time with no previous state. Because of the range of the respective transceivers included within the nodes, assume nodes A, B and C are able to communicate directly with each other whereas node D can only communicate directly with node C. All routing tables are initialized and thus include only their respective loop-back route. Since the routing table of each of the nodes A through D is empty (i.e., includes only the respective loop-back route which is provided only for convenience), each of the nodes A through D enter a find neighbor state as represented in steps 92 and 94 in FIG. 4.

Figure 5B:
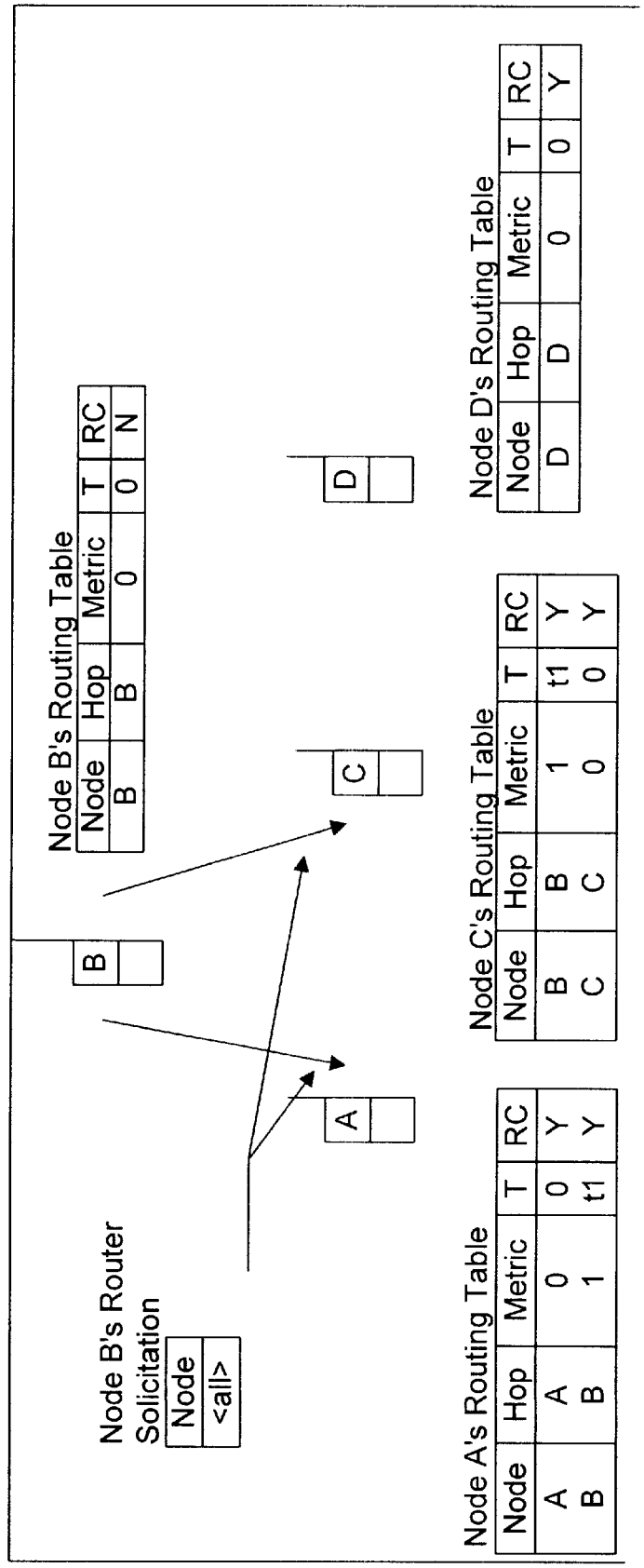

Referring now to FIG. 5b, assume that node B is the first node to multicast a router solicitation to its neighbors (node A and node C) asking for all routes as part of node B's find neighbor routine in step 94 (FIG. 4). Since both nodes A and C do not have node B in their respective routing tables, node A and node C use the information in the router solicitation received from node B to add node B (with a metric of one) to their routing tables 34 as discussed above in connection with steps 70 and 72 (FIG. 4). The source of the router solicitation, i.e., node B, is identified as the next hop included in the next hop field 40. Such change in the respective routing tables 34 prompts node A and node C each to perform a triggered update as represented in step 78 (FIG. 4) and as is discussed below in connection with FIGS. 5c and 5d, respectively. It is noted that these triggered updates in step 78 override unicast routing advertisements that node A and node C would otherwise send to node B in step 76 (FIG. 4) in response to the router solicitation from node B. Also, since node A and node C now have entries in their respective routing tables 34 (i.e., corresponding to node B), both nodes transition out of the find neighbor state of step 94 (FIG. 4) as discussed below. As a result, neither node A nor node C sends out its otherwise scheduled router solicitation.

Figure 5C:
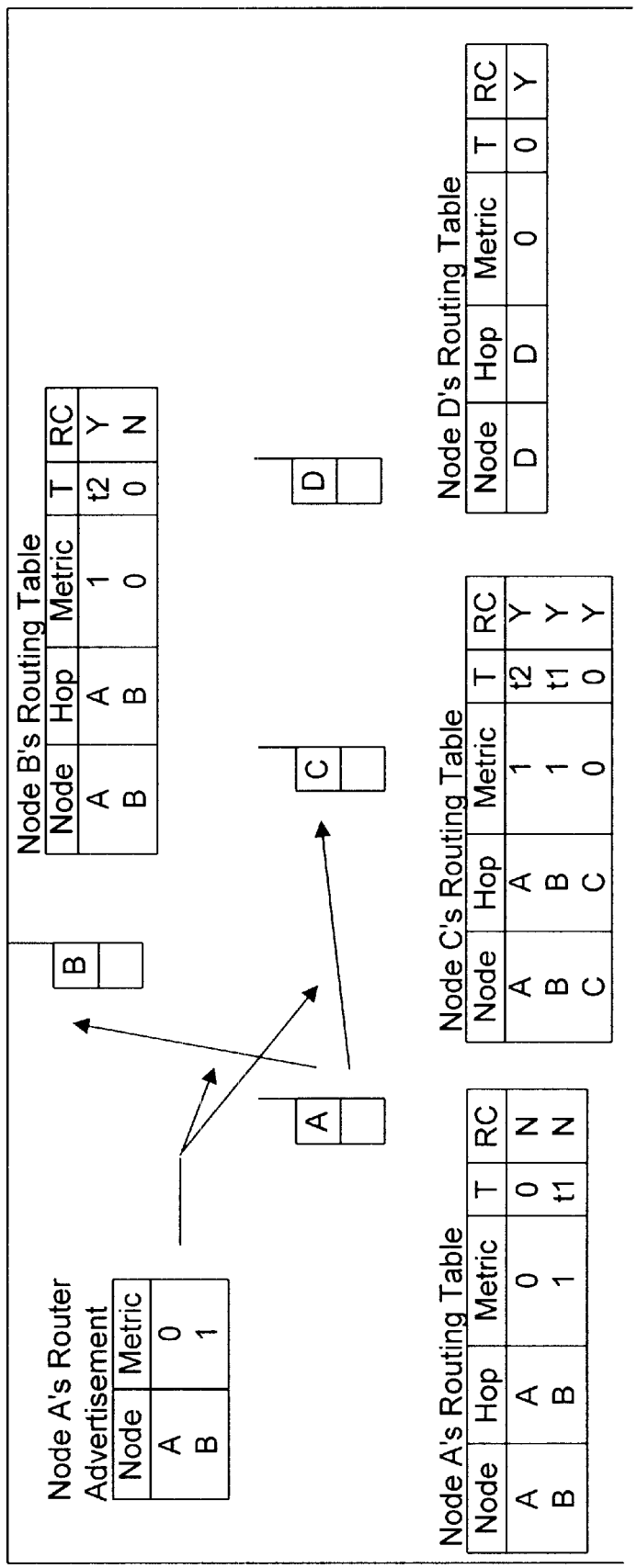
Figure 5D:
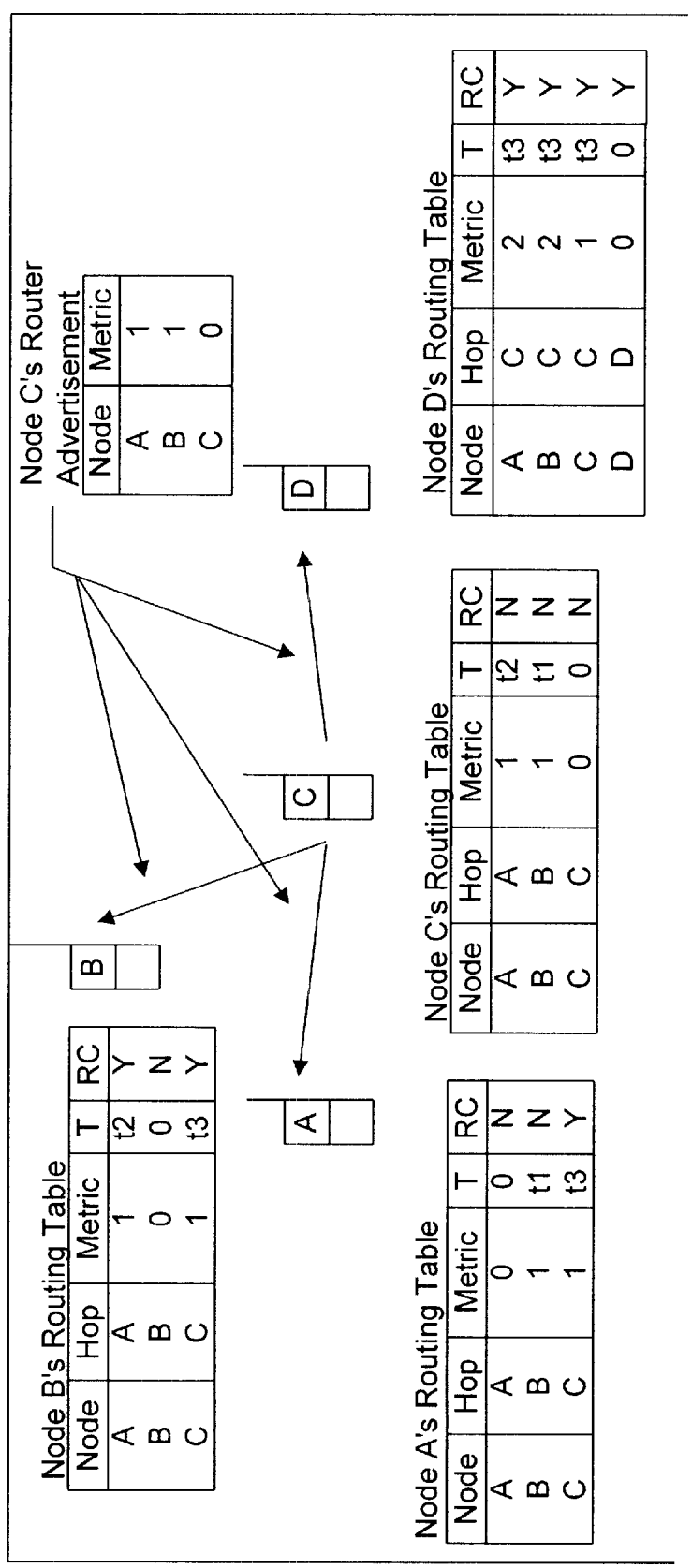

In FIG. 5c, it is assumed that node A is the first among nodes A and C to carry out its triggered update (step 78) in response to having added the route for node B to its routing table. Node A, as part of its triggered update, multicasts a router advertisement to its neighboring nodes (e.g., node B and node C). The router advertisement includes all routing information from node A's routing table 34 (in response to node B's request for all routes), including route information corresponding to node B as provided from node A's routing table. By virtue of node A being the source of the router advertisement, any nodes which receive the router advertisement are also able to ascertain routing information corresponding to node A. As shown in FIG. 5c, both node B and node C add route information for node A to their routing tables 34 as a result of receiving the router advertisement from node A (steps 80 and 82 in FIG. 4). However, both node B and node C discard the route information for node B since they already have existing routes to B with a lower metric in their routing tables. The addition of the routing information for node A in the routing tables of nodes B and C then forces triggered updates from these nodes (steps 84 and 86 in FIG. 4), as represented in FIG. 5d in the case of node C, for example. It is noted that node B's and node C's routing information for node A includes node A in the next hop field 40 since it was the source of the router advertisement which resulted in the addition of node A to its routing table.

Referring to FIG. 5d, a triggered update forces node C to multicast a router advertisement to any neighboring nodes (e.g., nodes A, B and D). Again since the router advertisement is in response to node B's request for all nodes, node C includes in the routing advertisement all routes in its routing table 34. Nodes A and B add routing information for node C to their respective routing tables in response to receiving the router advertisement (steps 80, 82 in FIG. 4); however they discard the route information for nodes A and B since they both have existing routes to nodes A and B with a same or lower metric in their routing tables. Node D, on the other hand, adds routing information for each of the advertised nodes A, B and C since node D's routing table 34 is otherwise empty. This evokes triggered updates from each of nodes A, B and D since each of their respective routing tables have changed (steps 84, 86). The triggered updates include routing information relating to those nodes whose route change flags have been set indicating a change since their last routing advertisement.

Figure 5F:
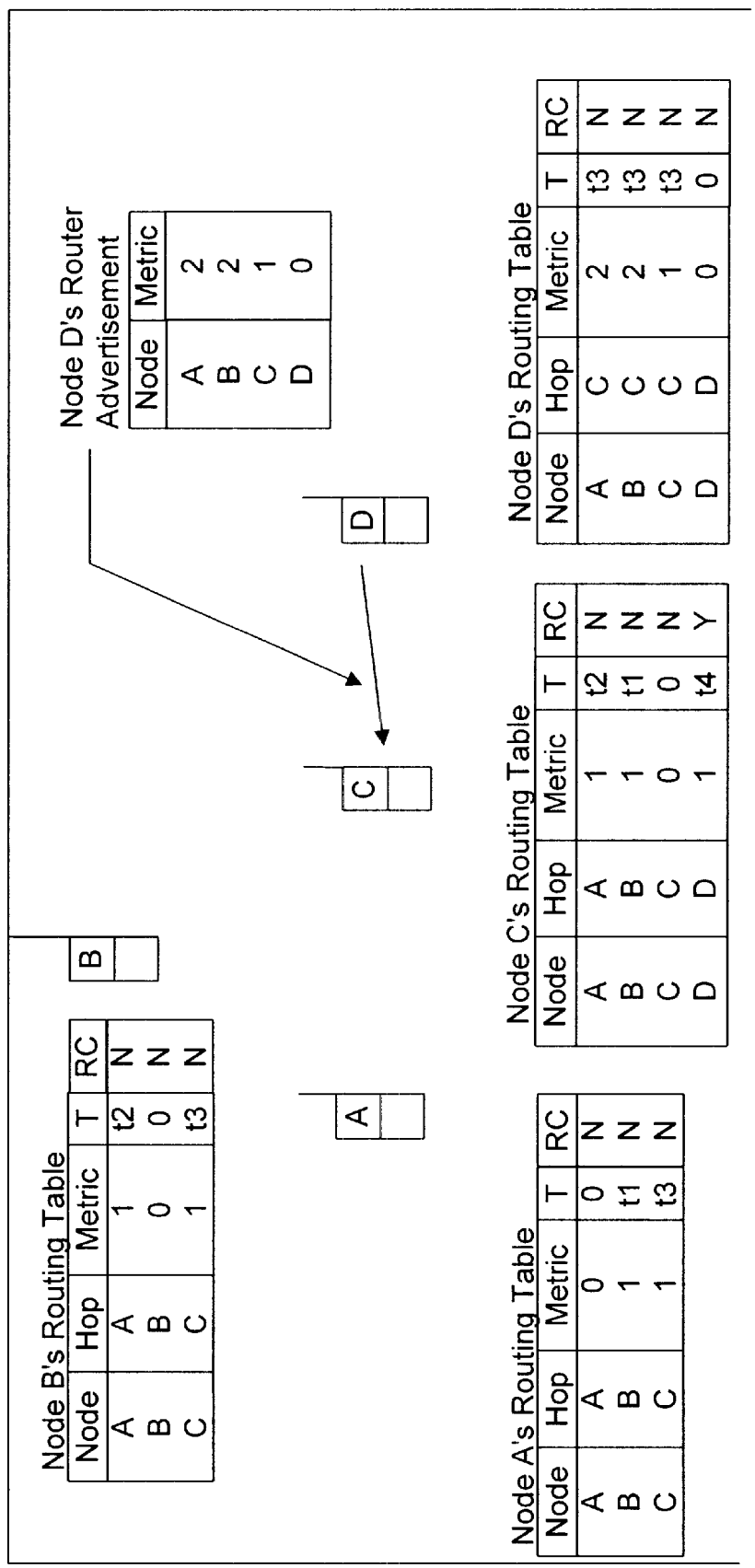

Since the triggered updates from nodes A and B offer no new or lower cost routes to any of their neighbors, they have no affect on their neighbor's routing tables 34. The route change flags in the routing tables are reset after the updates are sent. The routing tables for nodes A and B appear as shown in FIG. 5e after their respective updates are sent. The triggered update by node D causes node D to multicast a router advertisement (steps 84, 86) to its neighbors (e.g., node C), the router advertisement including routing information corresponding to nodes A through D (FIG. 5f). Node C receives the router advertisement and adds node D to its routing table. However, node C discards the route information for nodes A, B and C since it already has existing routes to these nodes with a lower metric in its routing table. This again evokes a triggered update from node C as represented in FIG. 5g.

Figures 5G, 5H:
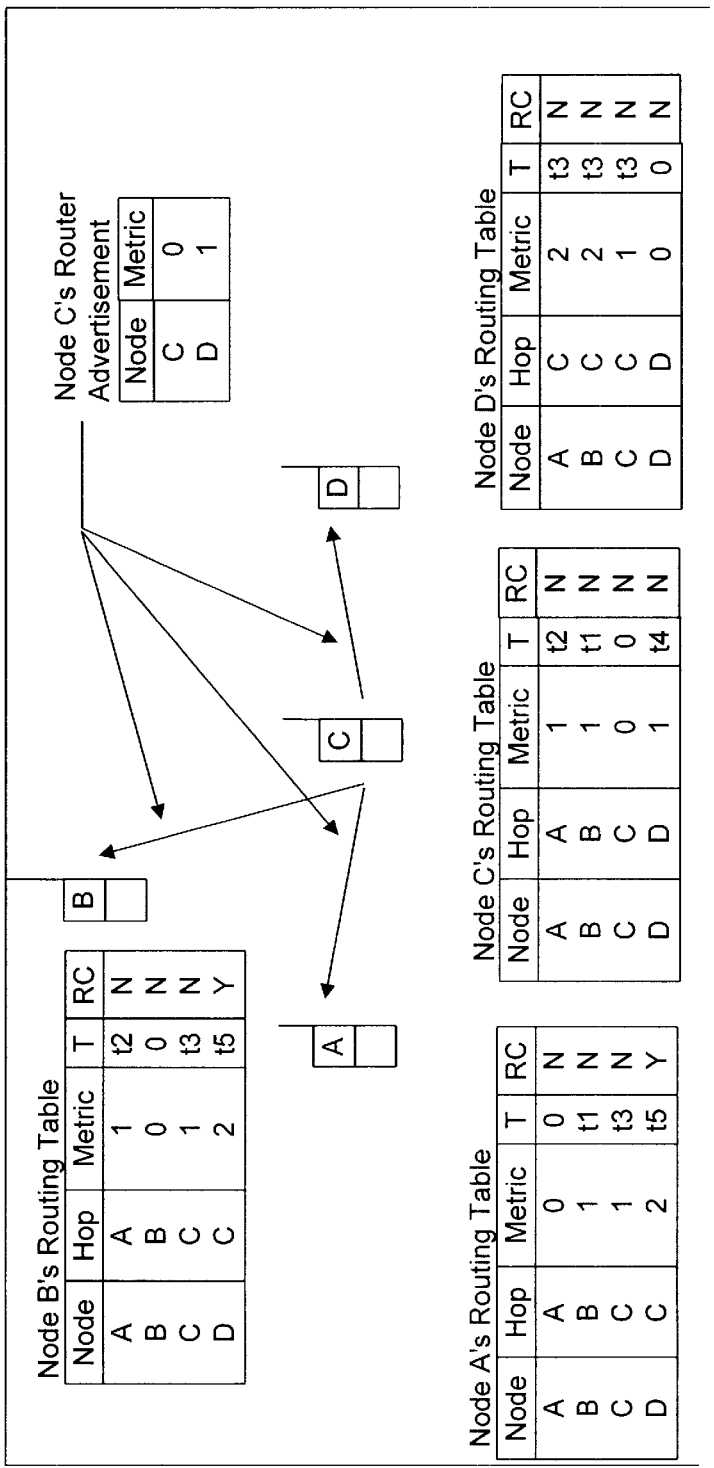

Referring to FIG. 5g, the triggered update causes node C to multicast a router advertisement to its neighbors (e.g., nodes A, B and D) (steps 84, 86). Since only route information corresponding to node D has been changed in node C's routing table, the router advertisement only includes an entry for node D. Nodes A and B receive the router advertisement and, since these nodes previously did not have node D in their routing tables, nodes A and B add node D to their routing tables. In this case, node C was the source of the router advertisement which resulted in the addition of node D. As a result, node C is identified in the next hop field 40 in connection with the node D entry in the routing tables of nodes A and B. The change in the routing tables of nodes A and B evokes triggered updates from these nodes. Node D also receives the router advertisement from node C. However, node D discards all the advertised routes as they already are included in node D's routing table with the same or lower metric.

Figures 5I, 5J:
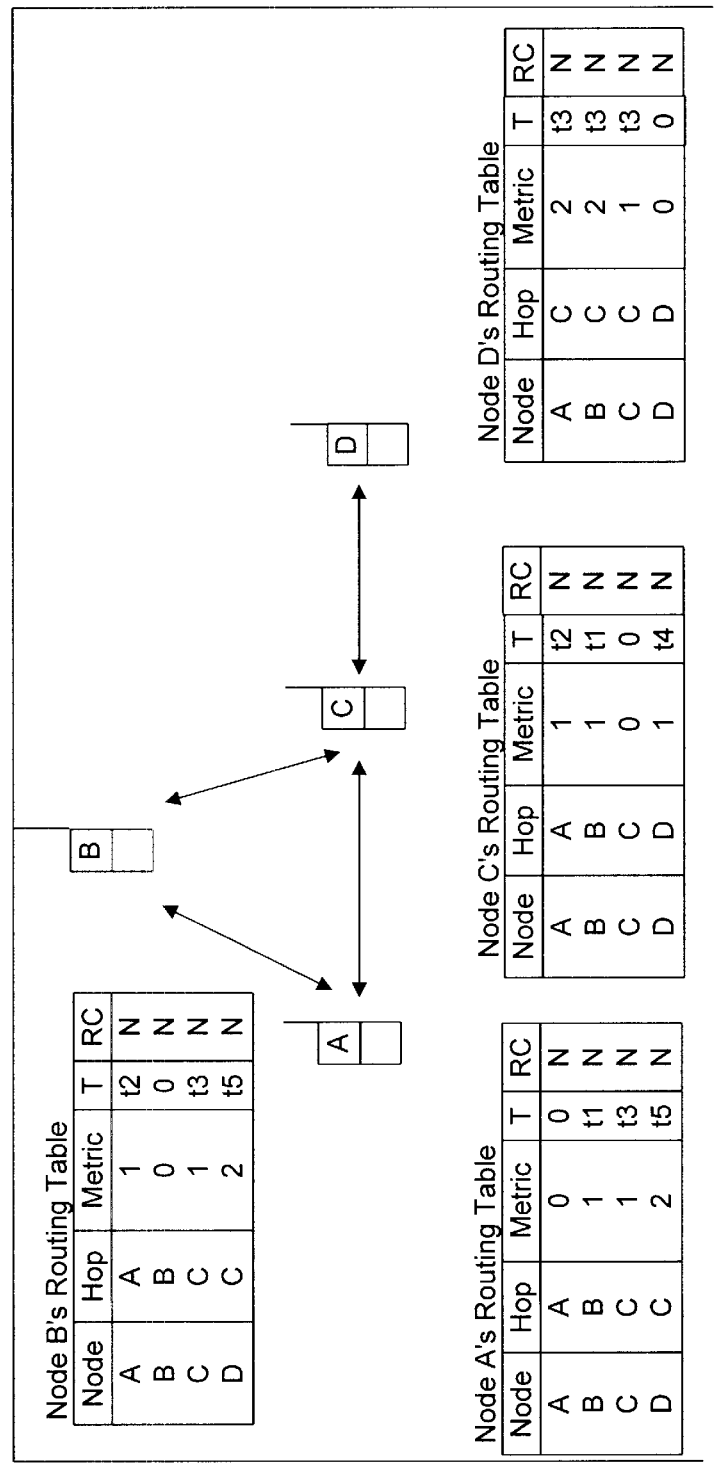

The triggered updates by nodes A and B resulting from the addition of the routing information for node D do not offer any new or lower cost routes to any of their neighbors. Consequently, they will have no affect on their neighbor's routing tables. The route change flags in field 46 are reset after the updates are sent, and the routing tables for nodes A and B will appear as shown in FIGS. 5h and 5i, respectively. At this point, all of the routing tables for nodes A through D will have converged in the network to a steady state as represented in FIG. 5j.

Figure 6A:
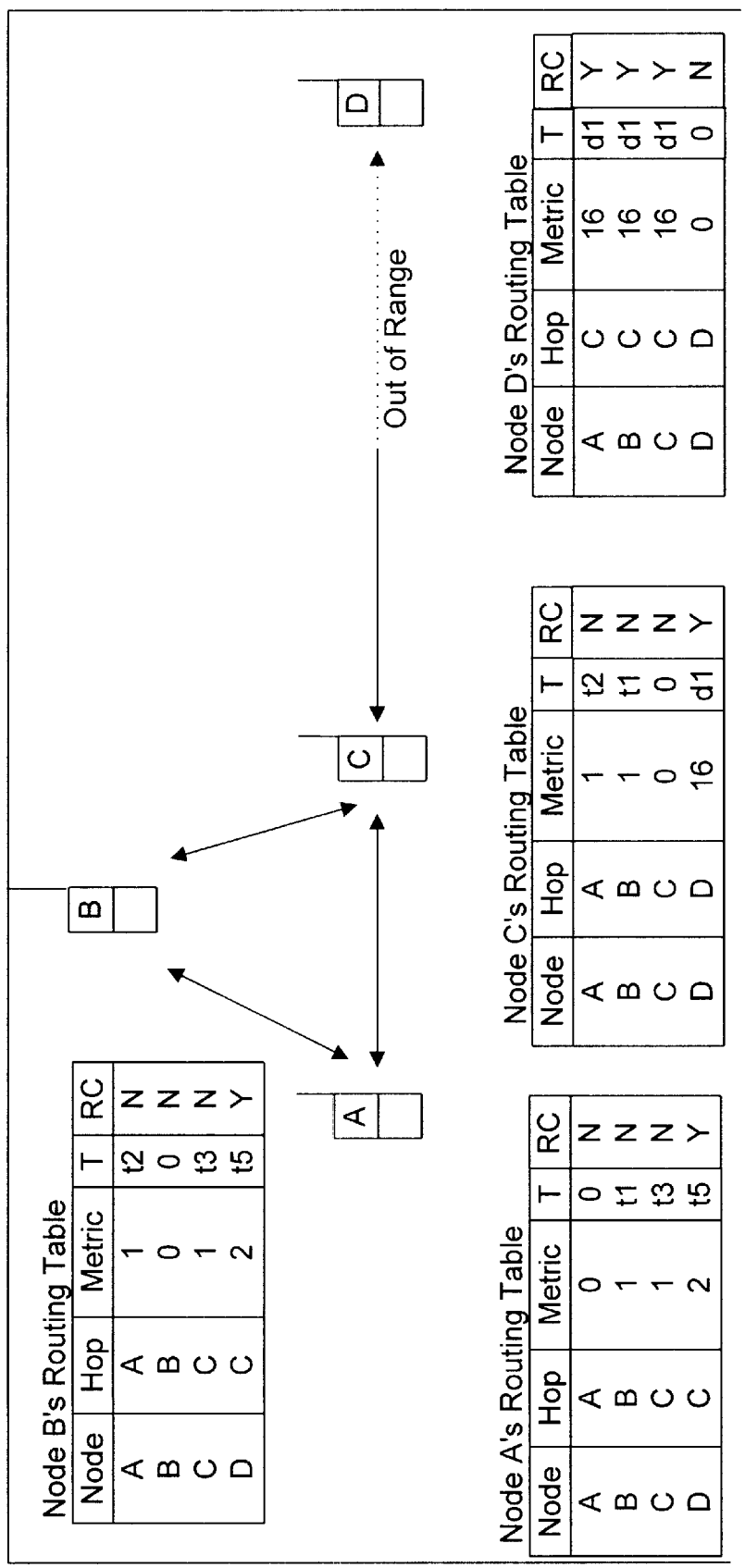
Figure 6B:
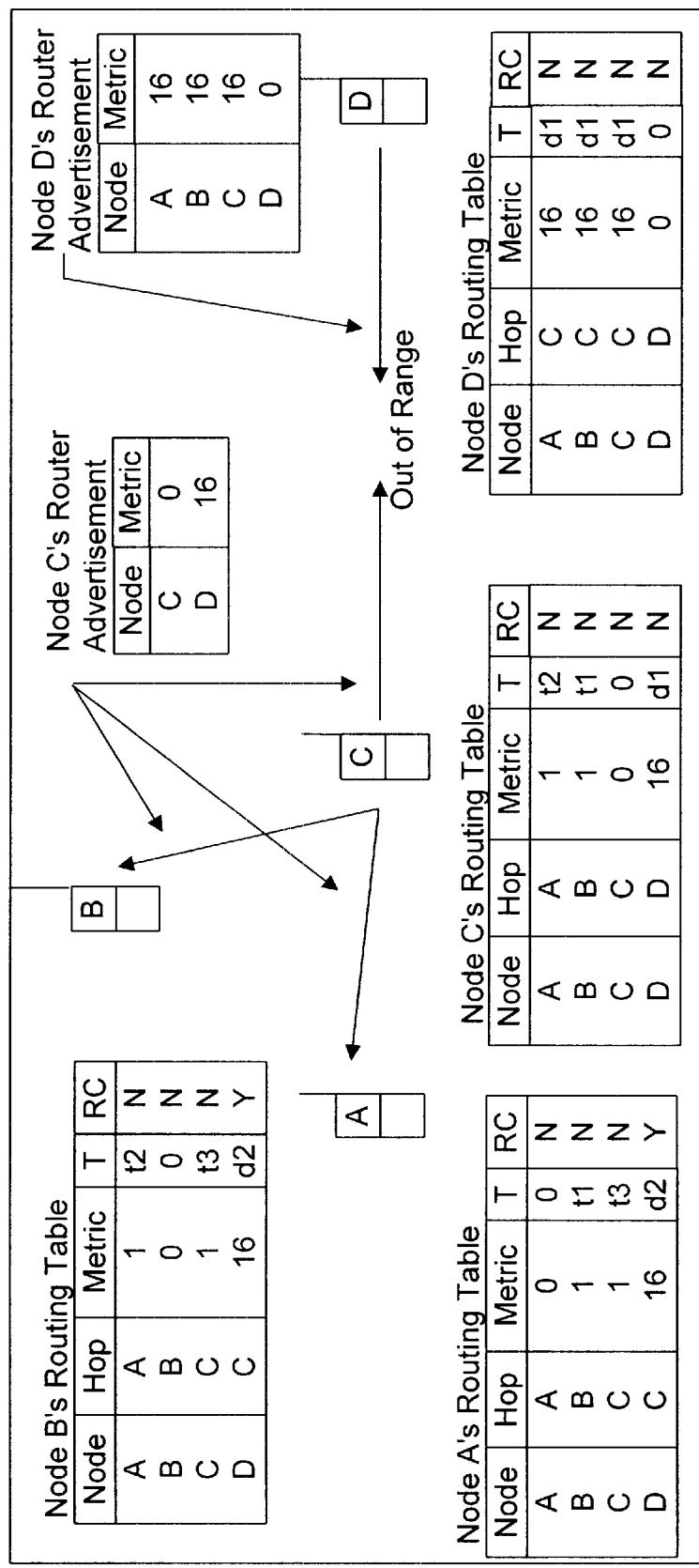

As previously noted, the present invention has particular utility when one or more of the nodes in the network is a mobile device. Specifically, the routing information within the routing tables of the respective nodes is changed dynamically as a result in changes in the topology of the network due to movement among nodes. FIGS. 6a–6l illustrate an example where a node moves out of range of the others and another node is added to the network. Referring initially to FIG. 6a, assume that the network initially is in the steady state represented in FIG. 5j discussed above. Next, as shown in FIG. 6a assume that node D roams out of range of its previous neighbor node C. Node C detects that the link to node D has failed either due to a delivery failure (see step 100 of FIG. 4; also discussed in detail below in connection with FIG. 15), or the timeout period for the routing table entry having timed out (step 90; also FIG. 14). Node C sets the metric for the route for node D to be "infinity" which, in the present embodiment, is a predetermined number such as "16". More specifically, "infinity" as referred to herein is a metric whose value is one greater than the maximum number of hops allowed in the network. In addition, node C sets a delete timeout period for the node D route in field 44 as is described in more detail below in relation to FIG. 14. This change in node C's routing table causes a triggered update to be sent from C as shown in FIG. 6b. In addition, all routes in the routing table of node D will timeout (step 90) such that their metrics are set to infinity and delete timeout periods are set. Such changes in node D's routing table also forces a triggered update from node D; however, no nodes are within range of node D to receive such update.

Referring to FIG. 6b, the triggered update of node C causes the node to send a router advertisement to its neighbors (e.g., nodes A and B) indicating (by virtue of the metric equaling infinity) that node D can no longer be reached through node C. Nodes A and B update their routing tables by setting the metric for the node D entry to infinity and by setting a delete timeout period in field 44 for node D. Such route updates in nodes A and B cause these nodes to perform a triggered update. Since such triggered updates from nodes A and B offer no new or lower cost routes to any of their neighbors, they have no affect on their neighbors' routing tables. The route change flags are reset after the updates are sent. This causes the routing tables for nodes A and B to appear as shown in FIG. 6c following their respective updates.

Figure 6D:
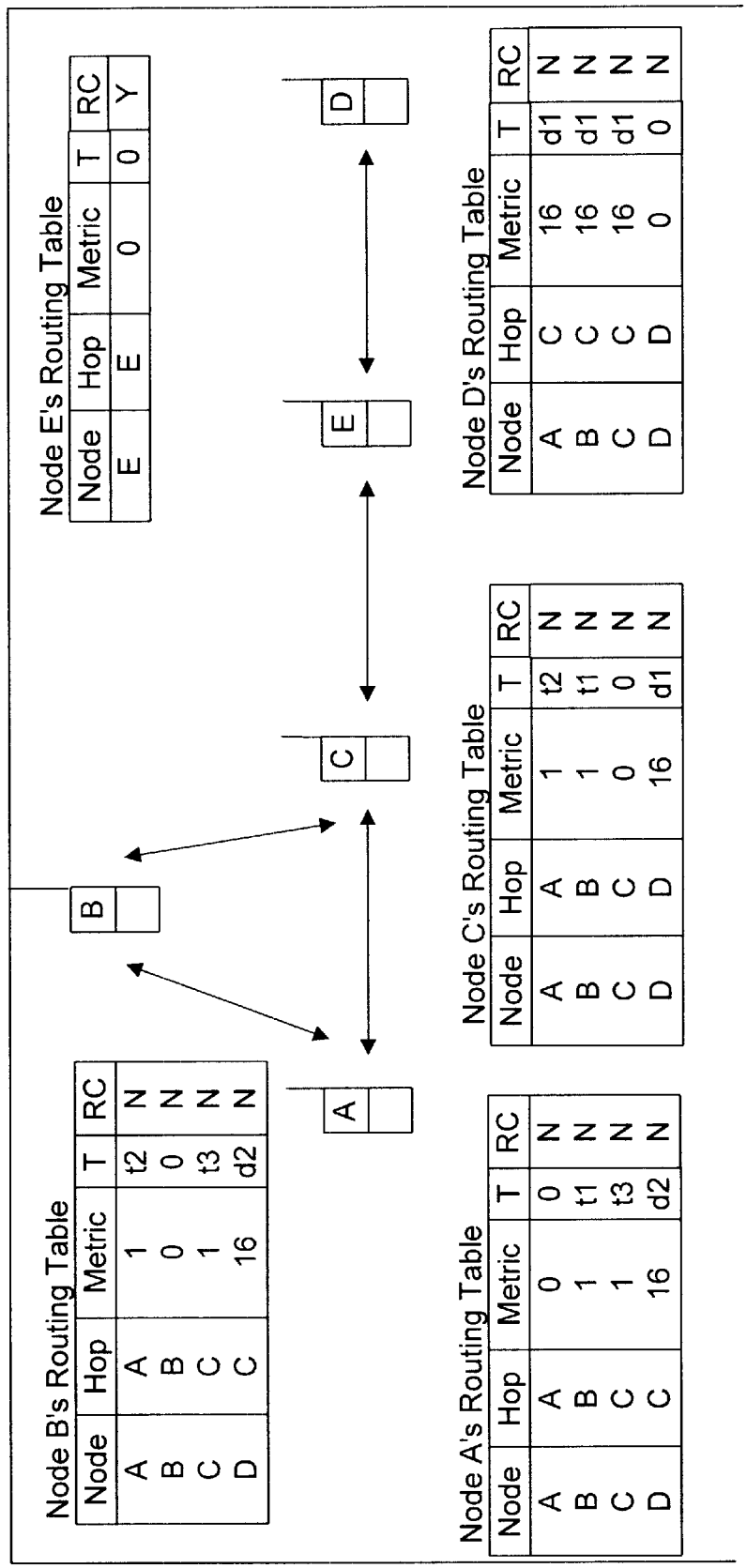
Figure 6E:
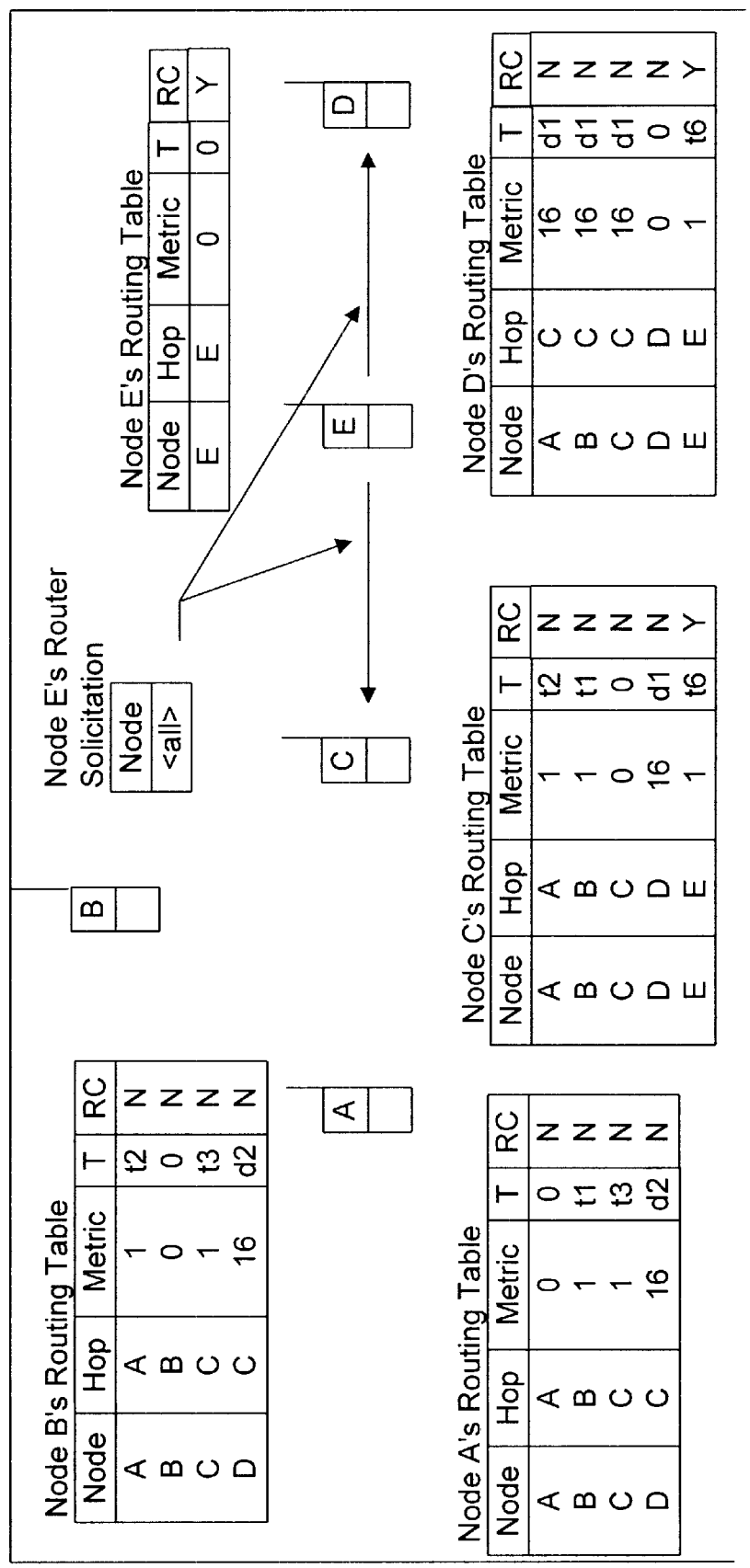

Turning now to FIG. 6d, assume a new node (node E) enters the network and spans the gap between nodes C and D before the delete timeout periods in the routing tables for nodes A through D expire. At such time, the routing table of node E is empty (i.e., only includes its loop-back route). Since node E's routing table is empty, node E enters its find neighbor state (steps 92, 94) and multicasts a router solicitation to its neighbors requesting all routes as represented in FIG. 6e. For sake of example, assume that node E is within range of nodes C and D. Nodes C and D will therefore receive the router solicitation. Since node E is not currently in the routing table of node C or node D, both node C and node D add node E to their respective routing table (steps 70, 72). This causes nodes C and D to perform a triggered update (steps 74, 78) as represented in FIGS. 6f and 6g, respectively.

Figure 6F:
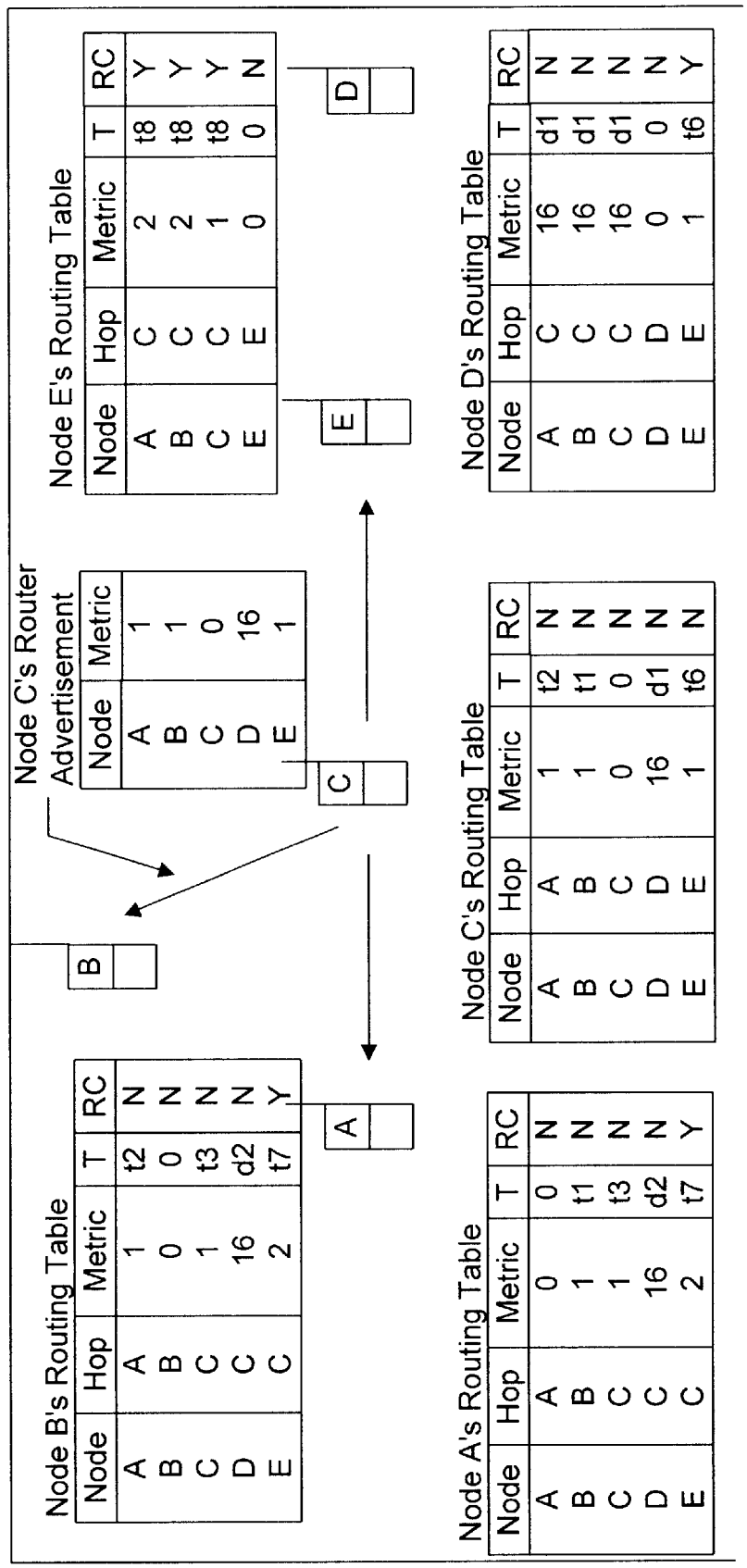

Referring to FIG. 6f, the triggered update by node C causes node C to multicast a router advertisement to its neighbors (nodes A, B and E). Note that the router advertisement includes all of the routes in C's routing table, not just the route which changed (node E). This is because it is combined with the response for all routes as solicited in the router solicitation from node E (step 78). Nodes A and B receive the router advertisement (step 80) and add a route for node E in their respective routing tables (step 82). This in turn evokes triggered updates from nodes A and B (step 86). Node E adds routes for nodes A, B and C to its routing table in response to the router advertisement from node C and in turn performs a triggered update (steps 80–86) as represented in FIG. 6i. Note that node E does not add a route for node D from node C's router advertisement since its metric is set to infinity.

Figure 6G:
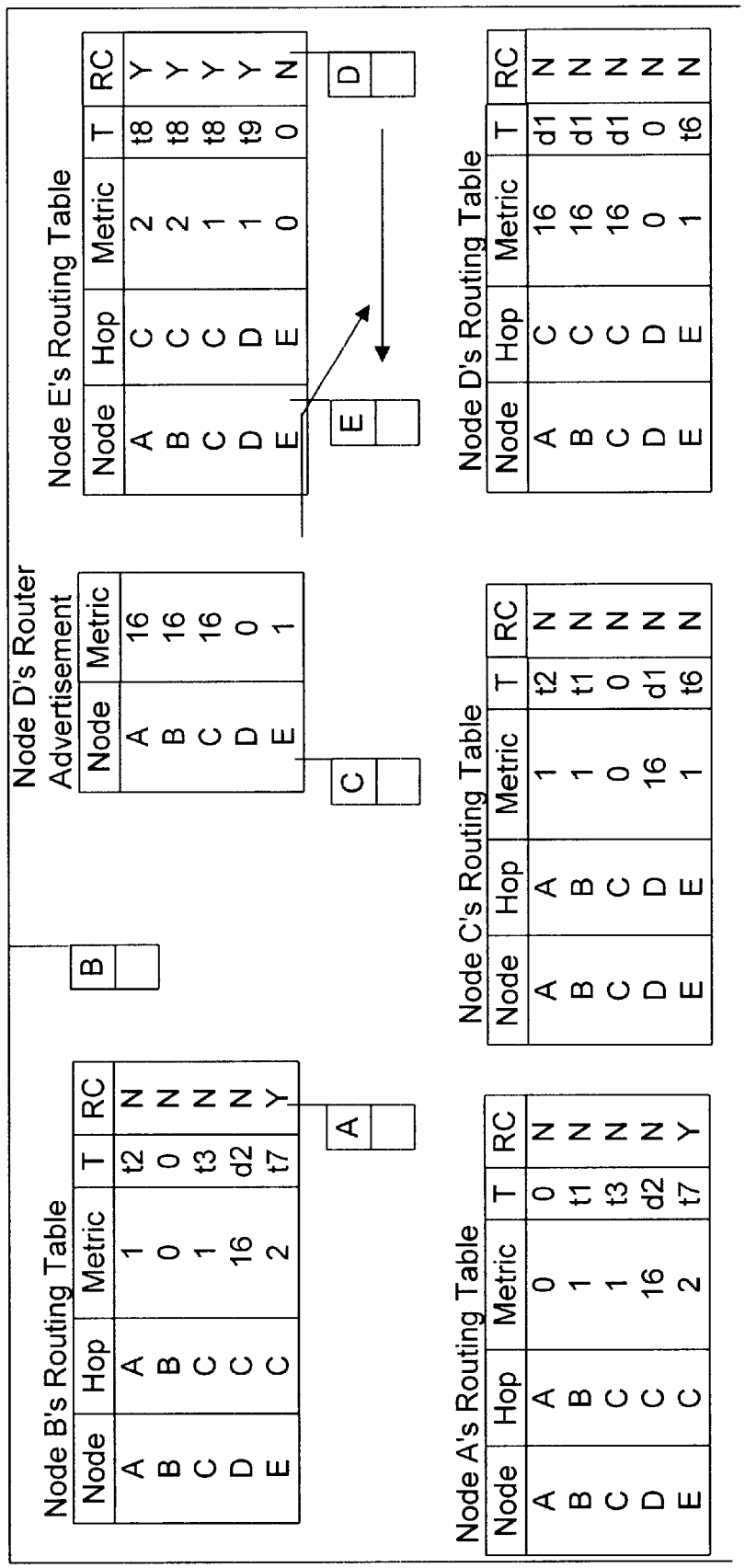
Figure 6I:
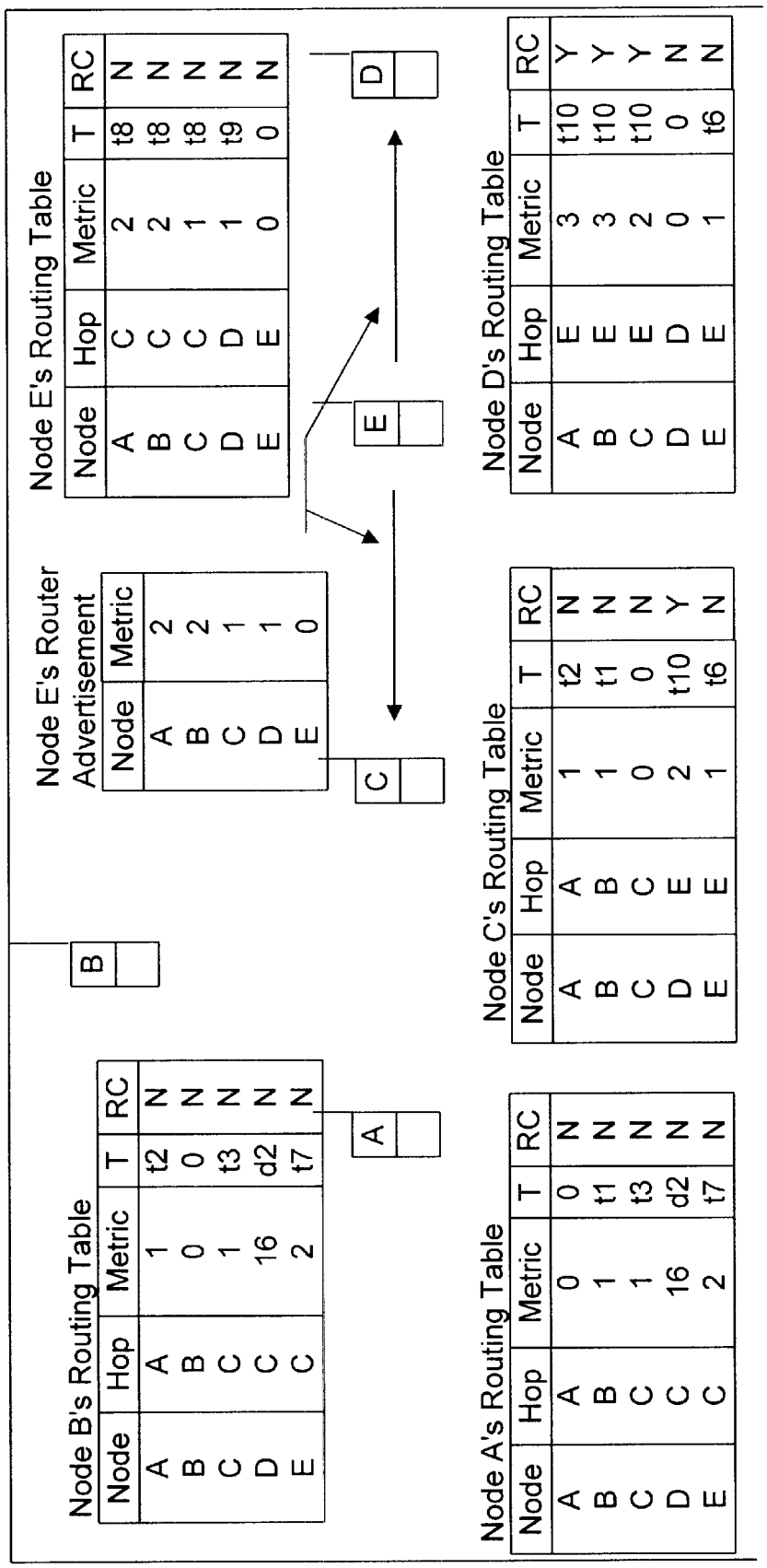

FIG. 6g represents the triggered update by node D in response to the receipt of the router solicitation from node E and the addition of node E to its routing table (FIG. 6e). Specifically, node D multicasts a router advertisement to its neighbors (e.g., node E) which includes all of the routes in node D's routing table since the router advertisement is in response to node E's solicitation for all routes. Node E receives the router advertisement and adds a route for node D based on the router advertisement. As a result, a triggered update (step 86) is initiated in node E. Note that node E ignores the routes for nodes A, B and C as identified in the router advertisement from node D. This is because node E has valid routes to these nodes via another route (node C).

Since the triggered updates from nodes A and B (due to the addition of a route for node E as shown in FIG. 6F) offer no new or lower cost routes to any of their neighbors, the updates have no affect on their neighbor's routing tables. The route change flags are reset after the updates are sent. Consequently, the routing tables for nodes A and B in turn appear as shown in FIG. 6h.

Referring now to FIG. 6i, a triggered update is performed by node E in response to the changes in its routing table discussed above in relation to FIGS. 6f and 6g. Specifically, node E multicasts a router advertisement to its neighbors C and D (step 86) which includes recently added routes corresponding to nodes A through D. Node C receives the router advertisement and updates its routing table by replacing the invalid route for node D with a route through node E, and ignores all other routes. This triggers an update from node C as discussed below in connection with FIG. 6j. Node D receives the router advertisement from node E and replaces the invalid routes to nodes A, B and C with routes through node E, triggering an update from node D.

Figure 6J:
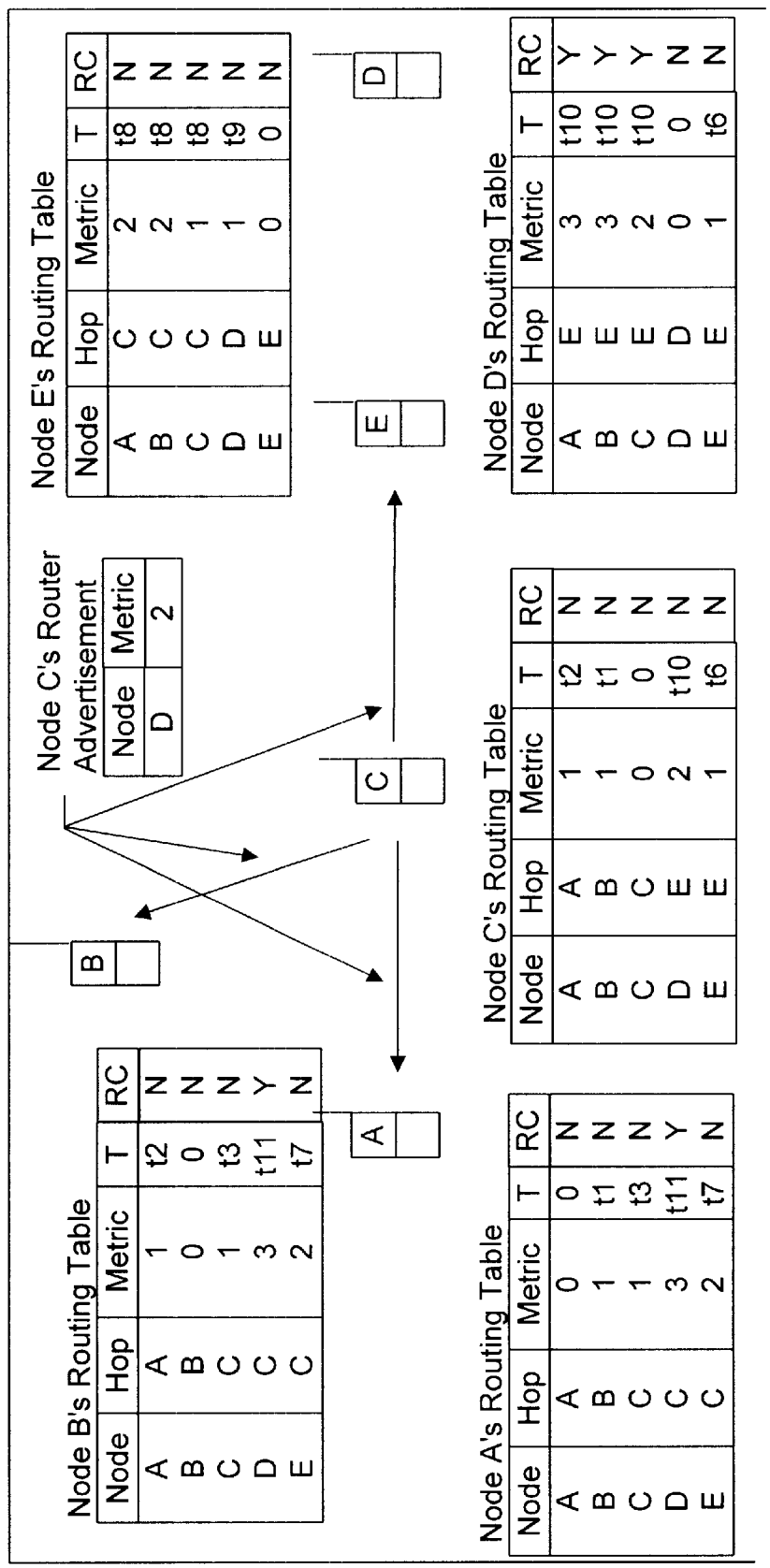
Figure 6I:
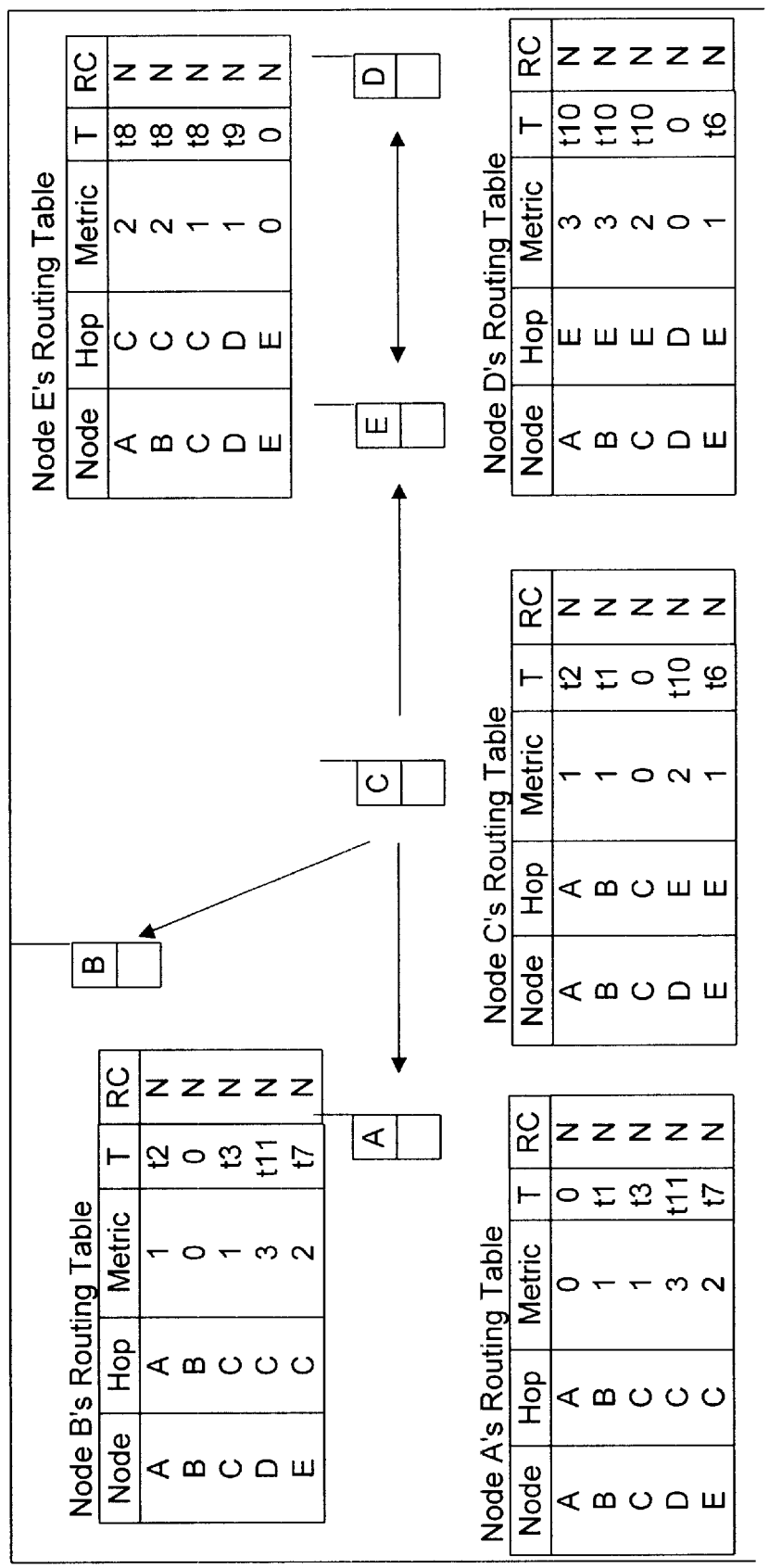

FIG. 6j represents the triggered update from node C in response to the router advertisement from node E. In particular, node C multicasts a router advertisement to its neighbors (e.g., nodes A, B and E). The router advertisement includes the routing information relating to the newly changed route to node D. Nodes A and B update their routing table replacing the invalid route to node D with a route through node C. This triggers an update from nodes A and B. Node E ignores the advertisement since no new or lower cost routes are offered. Since the resultant triggered updates by nodes A and B, together with the triggered update performed by node D in relation to FIG. 6i, offer no new or lower cost routes to any of their neighbors, they have no affect on their neighbors' routing tables. The route change flags are reset after the updates are sent. The routing tables for nodes A, B and D following their respective updates appear as shown in FIG. 6k. At this point, all of the routing tables of the respective nodes in the network have converged to a steady state as represented in FIG. 6l. Data packets can be sent between the nodes based on the information contained in the routing tables as is discussed more fully below.

Figure 7:
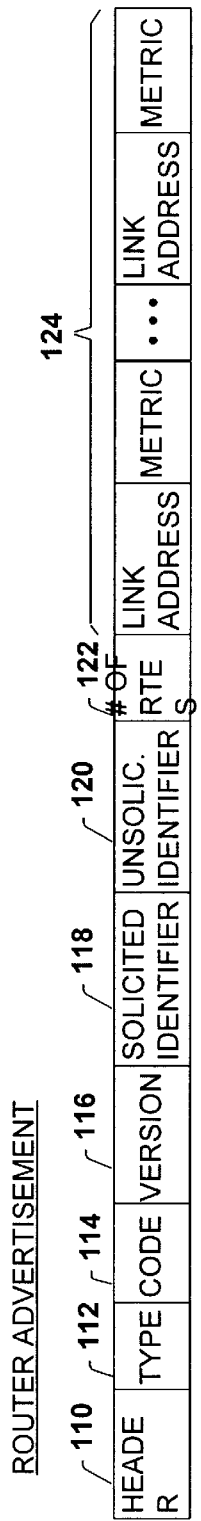
FIG. 7 represents an exemplary format of a router advertisement communicated between nodes in accordance with the present invention.

Referring now to FIG. 7, an exemplary format is shown for the aforementioned router advertisements. Each router advertisement is in the form of a packet which includes a header field 110 identifying the source and destination of the router advertisement as discussed below in connection with FIG. 9. Adjacent the header is a type field 112 which includes a predefined identifier which identifies the packet as relating to routing protocol so that the packet will be recognized as such by receiving nodes. A code field 114 includes a predefined identifier indicating to any receiving nodes that the packet is a router advertisement. A version field 116 includes a predefined identifier which identifies the particular version of routing protocol which is being carried out so that all nodes in the network employ the same version (provided multiple versions become available). A solicited identifier field 118 is utilized in the event the router advertisement is being sent as a result of a router solicitation (e.g., in step 76 of FIG. 4). Specifically, each router solicitation also has a solicited identifier field 118 as discussed below in connection with FIG. 8. The solicited identifier field 118 contains a non-zero value identifying the particular router solicitation. Each node 25 is programmed to increment the solicited identifier value with each router solicitation it transmits. The solicited identifier from the router solicitation is copied into the solicited identifier field 118 of the router advertisement. In this manner, the node 25 which transmitted the router solicitation can identify router advertisements in response thereto. The solicited identifier field 118 is set to zero if the router advertisement is unsolicited (i.e., not in response to a router solicitation).

The router advertisement also includes an unsolicited identifier field 120 which is utilized in those cases where the router advertisement is sent out as a multicast (e.g., as part of a triggered or scheduled update in steps 78, 86, 94 and 100). The unsolicited identifier field 120 includes a non-zero value which is incremented each time a node sends out an unsolicited router advertisement. The unsolicited identifier in field 120 allows nodes 25 receiving the router advertisement to silently discard duplicate advertisements which can occur in an embodiment in which router advertisements are repeated in rapid succession. This may be desirable when communicating in a high bit error rate media. If the router advertisement is a solicited advertisement (i.e., step 76) the unsolicited identifier field 120 is set to zero, with the exception that if the router advertisement is a triggered update resulting from a router solicitation (i.e., step 78), both the solicited and unsolicited identifier fields 118 and 120 are utilized.

The router advertisement further includes a "number of routes" field 122 which is set by the sending node 25 and which identifies for the receiving node 25 the number of reachable nodes which will be specified in the router advertisement. Finally, the router advertisement includes a link address field 124 which includes the link network addresses and the corresponding metrics of the reachable nodes as taken from the routing table 34 of the sending node 25. For scheduled updates this will include all nodes identified in field 38 in the routing table. For triggered updates this will include all nodes whose route change flag is set in field 46 in the routing table. For a response to a router solicitation, this will include the nodes solicited and possibly those nodes whose route change flag is set.

Figure 8:
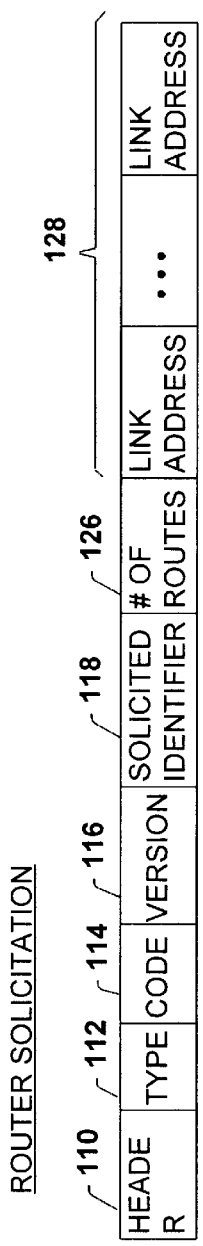
FIG. 8 is an exemplary format of a router solicitation exchanged between nodes in accordance with the present invention.

FIG. 8 shows an exemplary format for the router solicitations transmitted by the nodes 25. The router solicitation also is in the form of a packet and includes a header 110 similar to that included in the router advertisement. Adjacent the header 110 is a type field 112 which, like the type field in the router advertisement, includes a predefined identifier which identifies the packet as relating to routing protocol so that the packet will be recognized as such by receiving nodes. A code field 114 is also included in the router solicitation, but it contains a predefined identifier indicating to any receiving nodes that the packet is a router solicitation rather than a router advertisement. A version field 116 similar to that included in the router advertisement also is included in the router solicitation. A solicited identifier field 118, as mentioned above, contains an identifier whose value uniquely identifies the particular router solicitation. A "number of routes" field 126 is set to the number of nodes 25 which will be requested in the router solicitation. If a node wishes to request all routes from a receiving node, the "number of routes" field 126 is set to zero. Finally, a link address field 128 includes the link addresses of the specific nodes for which routes are solicited. If the number of routes field 126 is set to zero, the link address field 128 is excluded.

Figure 9:
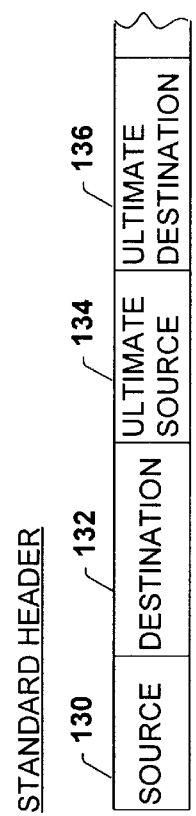
FIG. 9 is an exemplary format of a packet header in accordance with the present invention.

FIG. 9 illustrates an exemplary header field 110 for use in accordance with the invention. The header field 110 is utilized in the router advertisement and solicitation packets as noted above as well as with any data packets which are transmitted within the network. The header field 110 includes a source field 130 which identifies the immediate source node of the packet. In addition, the header field 110 includes a destination field 132 which identifies the immediate destination node of the packet. If the packet is to be multicasted, the destination field 132 is set all "1's". The header field 110 also includes an ultimate source field 134 that identifies the ultimate source node of the packet, namely the node from which the packet originated. Finally, the header 110 includes an ultimate destination field 136 that identifies the ultimate destination node of the packet, i.e., where the packet is ultimately intended to go. The ultimate source field 134 and ultimate destination field 136 are utilized only in the case of data packets where the packets may be forwarded. The ultimate source field 134 and ultimate destination field 136 remain unused in router advertisements and router solicitations which are not forwarded.

As is discussed below, each node 25 includes a processor which is programmed to transmit and receive packets according to the formats shown in FIGS. 7–9. More specifically, the processor is programmed to insert the appropriate information in the respective fields depending on the circumstances as will be appreciated.

Figure 10:
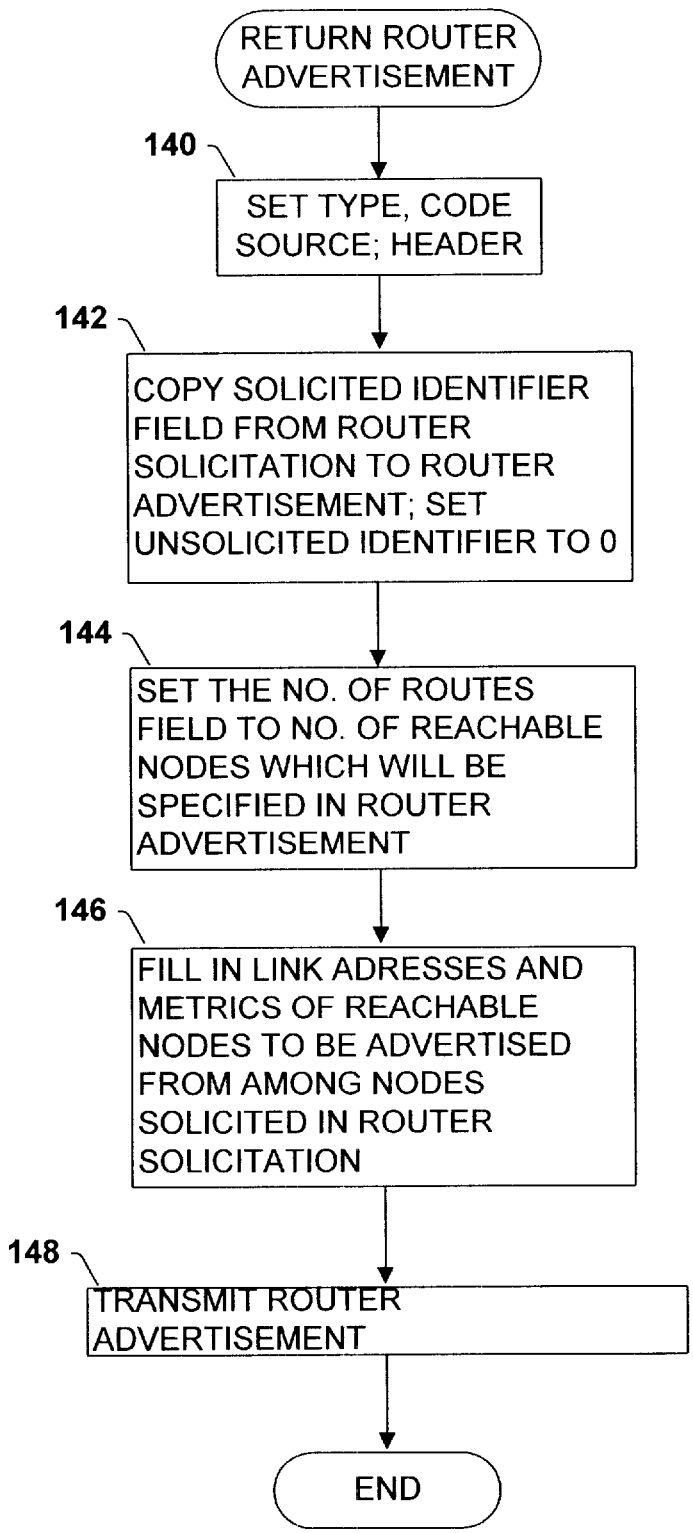
FIG. 10 is a flowchart representing a procedure whereby a node transmits a router advertisement identifying a list of other nodes which are reachable through its interface in accordance with the present invention.

Referring now to FIG. 10, the process is shown whereby a node 25 returns a router advertisement in response to a router solicitation as represented in step 76 of FIG. 4. Beginning in step 140, the node 25 is programmed to begin generating a router advertisement. In step 140 the node 25 sets the type field 112 to represent a routing protocol packet. The code field 114 is set to indicate a router advertisement. The version field 116 is set to represent a particular version assumed to be the same throughout the present embodiment. In the header 110, the source field 130 is set to identify the node 25 which is transmitting the router advertisement. The destination field 132 is copied from the source field 130 of the router solicitation which prompted the router advertisement so as to indicate that the router advertisement is intended for the node 25 which sent the router solicitation. In other situations where the router advertisement is intended to be multicasted, however, the destination field 132 is set to all "1's". The ultimate source and destination fields 134 and 136 are unused as indicated above.

In step 142 the solicited identifier from field 118 of the router solicitation is copied to the solicited identifier field 118 of the router advertisement. The unsolicited identifier in field 120 is set to zero since the router advertisement is solicited. Next, in step 144 the number of routes field 122 is set to indicate the number of reachable nodes which will be specified in the router advertisement. In step 146 the link addresses and corresponding metrics of the reachable nodes which are included in the routing table 34 of the node 25 and which are solicited in the router solicitation are included in the link address field 124. To the extent that the routes solicited include the subject node itself, it is not necessary that the route for the subject node be included in the link address field 124. Such information is ascertained from the source field 130 of the router advertisement itself as discussed below in FIG. 11. Finally, in step 148 the node 25 transmits the router advertisement to the node which issued the router solicitation.

FIG. 11a–11e represent the procedure in which a node 25 updates its routing table 34 as represented in steps 80 and 82 in FIG. 4. Beginning in step 150, the node 25 determines if the routing table is being updated in response to a router advertisement (e.g., step 82). If yes, the node 25 proceeds to step 152 in which it begins the process of reviewing the contents of the router advertisement and updating its routing table 34 based thereon. Specifically, the node 25 looks both to the source field 130 of the router advertisement and to each of the link addresses included in the link address field 124, although one at a time, to determine if new or lower cost routes are available in the router advertisement. In step 152 the node 25 selects, for example, the source node of the router advertisement (or the next link address in the link address field 124). Then, in step 154 the node 25 determines if the advertised metric of the selected source node or link address node is less than infinity (e.g., "16"). It is noted that in the case of the source node represented in the source field 130 of the router advertisement, the metric is predetermined to be "0" since router advertisements are received only directly from the source node.

If the advertised metric is less than infinity as determined in step 154, the node 25 proceeds to step 156 in which the advertised metric is modified to include the cost of the hop on which the router advertisement was received. Typically, although not always, this will involve incrementing the advertised metric by one to indicate the added cost of one hop. For instance, different criteria may be utilized in different embodiments for determining the added cost. For example, the amount by which the advertised metric is modified may take into consideration such things as traffic load, etc. A node which is incurring heavy data traffic may increment an advertised metric by more than one so as to discourage other nodes from using such node as a link. As another example, the cost associated with one hop may be greater than one under different conditions such as when a node has two radios (e.g., LAN and WAN, or 2.4 GHz and 900 MHz. In such case a higher cost would be associated with hops over the slower medium.

Following step 156, the node 25 proceeds to step 158 in which it determines if the selected source/link address node already exists as an entry in the node's routing table 34. If yes, the node 25 continues to step 160 in which it determines if the source of the router advertisement (as determined from the source field 130) is the same as the node identified in the next hop field 40 (FIG. 2) for that entry. If no in step 160, the node 25 proceeds to step 162 in which the node 25 determines if the modified metric for the selected source/link address node is less than the metric already included in the routing table entry.

If yes in step 162, the node 25 continues to step 164 in which it replaces the existing route with the advertised route and sets the route change flag if necessary. More specifically, for the selected source node/link address which already exists in the node field 38 (FIG. 2), the next hop field 40 is set with the source node from the router advertisement as obtained from the source field 130. The metric field 42 is set with the updated metric as determined in step 156. Finally, the route change flag in field 46 is set to "Y" if the updated metric is different from the previous metric. The node 25 then proceeds from step 164 to step 166 in which the timeout period in field 44 of the routing table 34 is set for the modified entry. Step 166 involves a route refresh routine which is described in more detail below in relation to FIG. 16. In step 166, the timeout period in field 44 for the modified entry is set to a predetermined time equal to ROUTE_ADVER_TIME×3, where ROUTE_ADVER_TIME is equal to the time interval (e.g., 10 seconds) between scheduled router advertisement updates as discussed below in connection with FIG. 17. Following step 166, the node 25 proceeds to step 168 where it determines if any source/link address nodes remain from the router advertisement which have not yet been processed. If yes in step 168, the node 25 returns to step 152 where the next node from the router advertisement is selected. If no nodes remain as determined in step 168, the node 25 proceeds to step 170 in which the routing table update routine is completed.

Figure 11A:
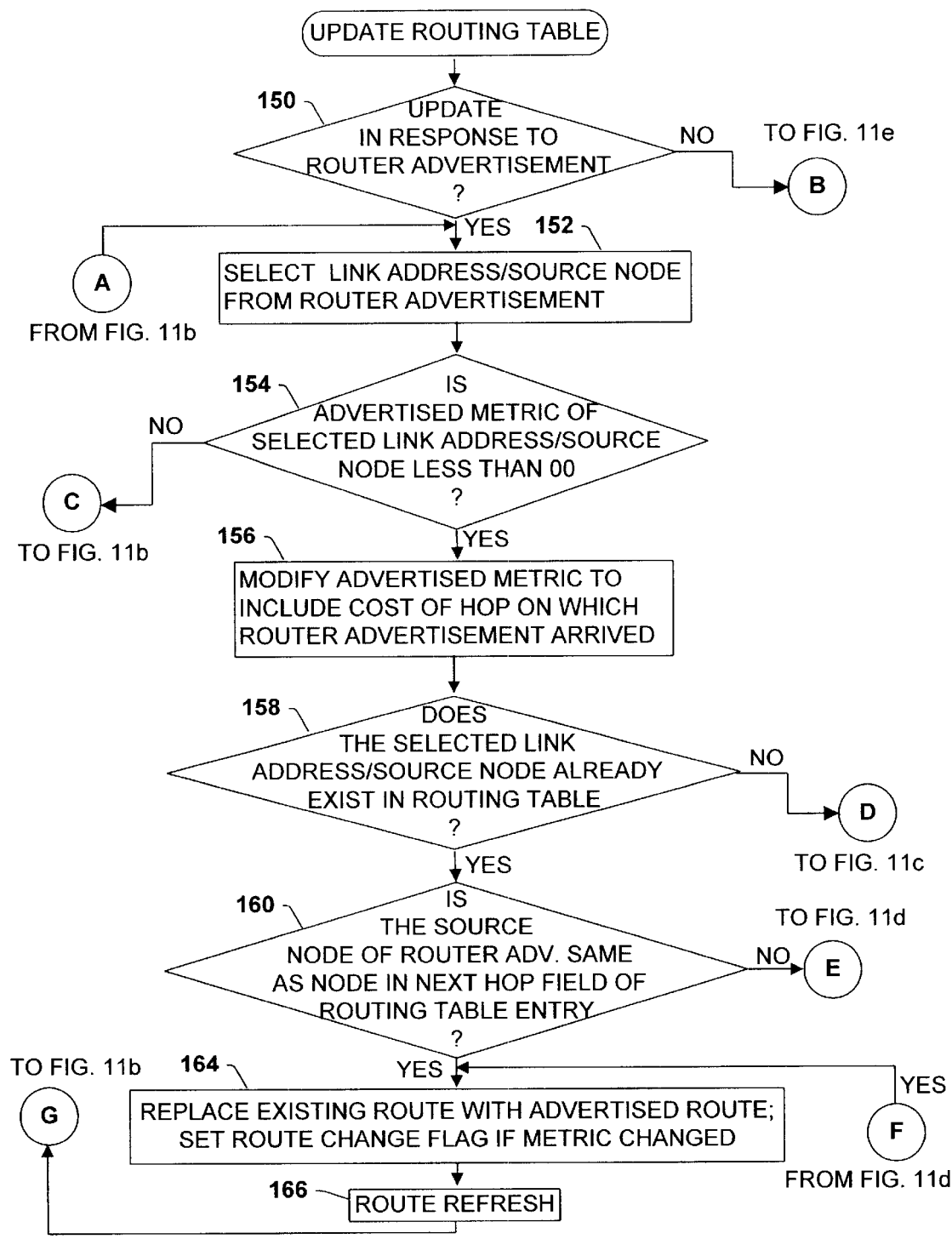
FIGS. 11a–11e is a flowchart illustrating a process in which a node updates its routing table in accordance with the present invention.
Figure 11B:
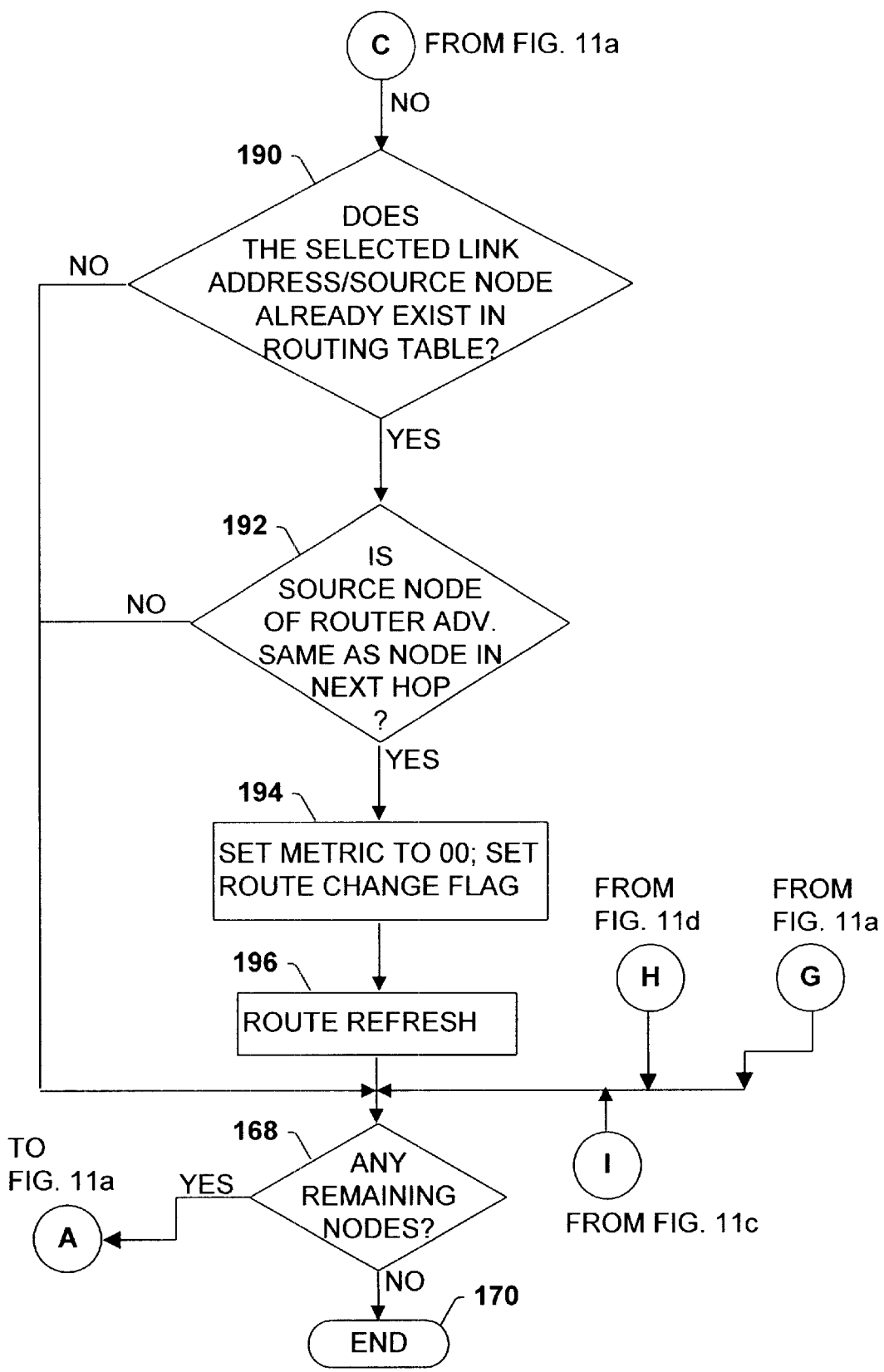
Figure 11C:
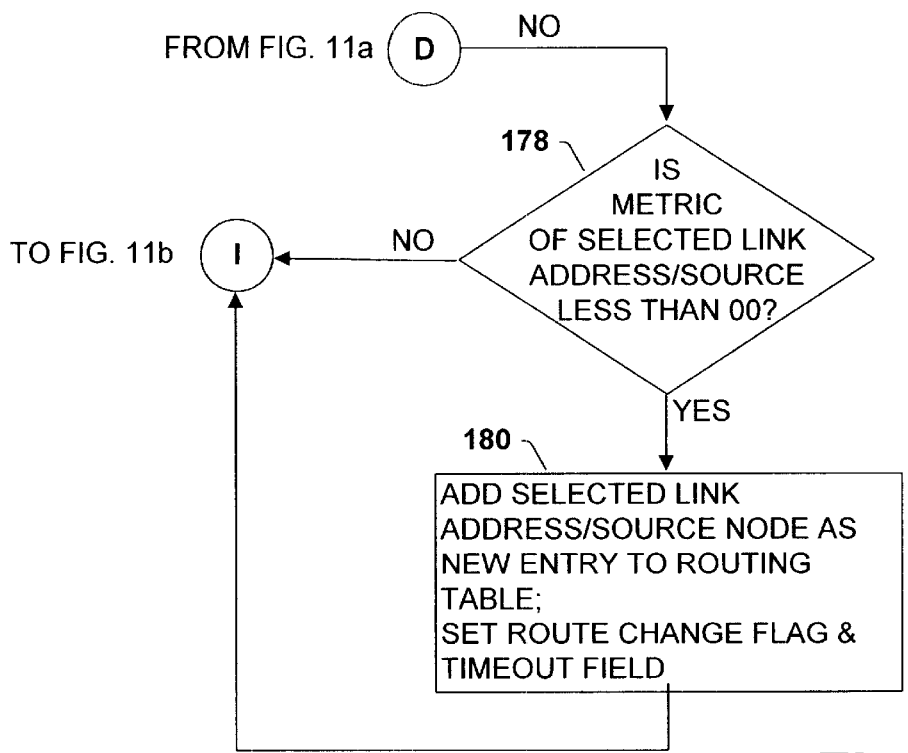
Figure 11D:
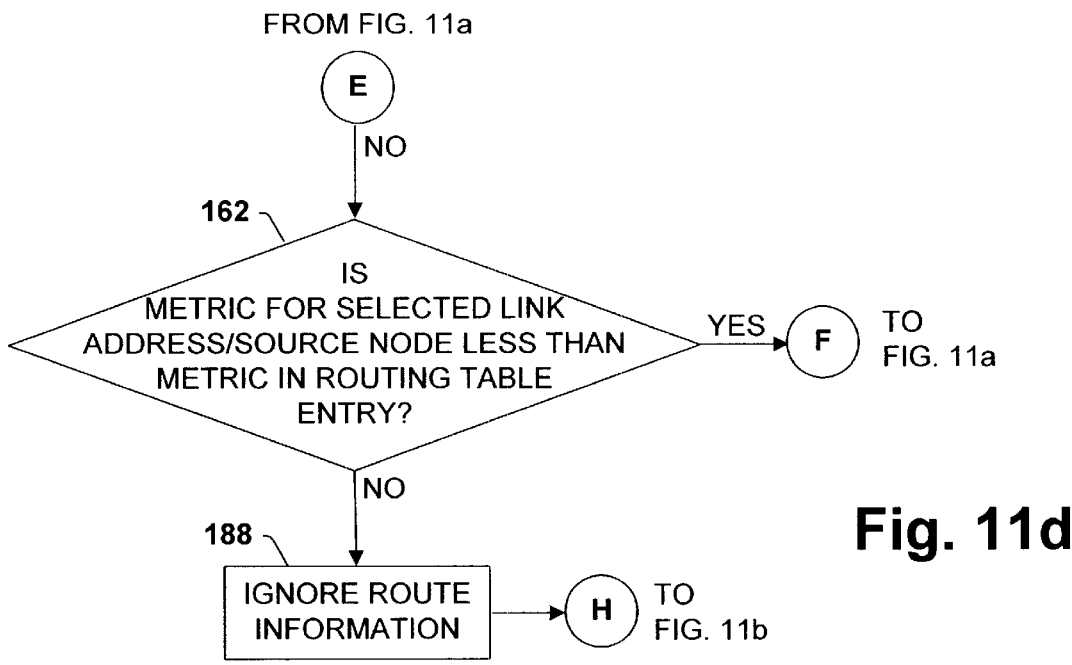
Figure 11E:
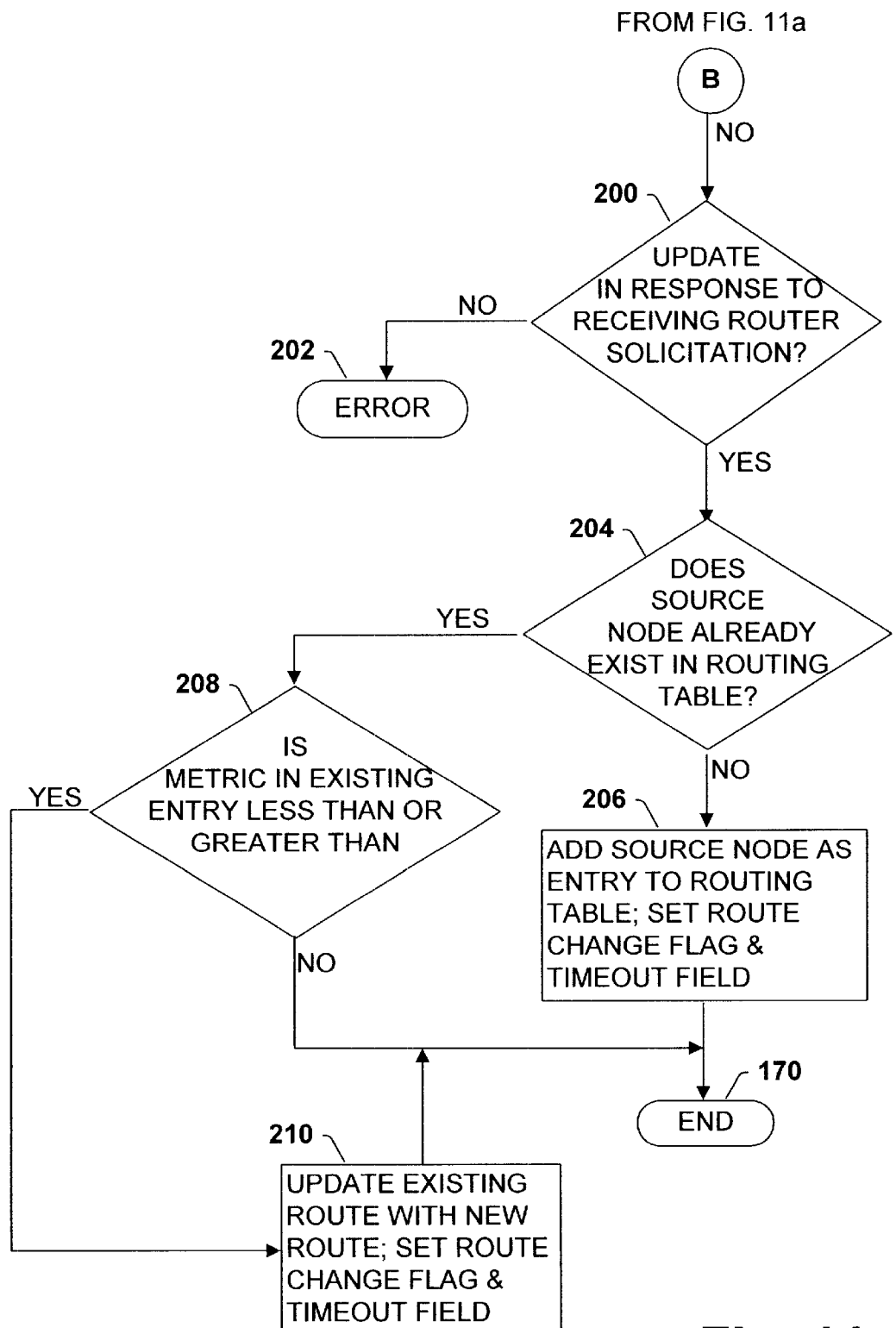

If in step 158 the selected source/link address node is determined not to exist already in the routing table 34, the node 25 proceeds to step 178 as shown in FIGS. 11a–11c. In step 178, the node 25 determines if the selected source/link address node has a modified metric which is less than infinity. If yes, the selected source/link address node is added as an entry to the routing table 34. Specifically, the selected node is added as an entry in node field 38 and the remainder of the corresponding fields are set as follows. The next hop field 40 is set with the source node which generated the router advertisement as obtained from the source field 130. The metric field 42 is set with the modified metric as determined in step 156. The timeout period in field 44 is reset to a predetermined time period such as ROUTE_ADVER_TIME×3. Finally, the route change flag in field 46 is set to "Y". If the modified metric as determined in step 156 is equal to or greater than infinity, the route corresponding to the selected node is not added as it is considered to represent an invalid route and the node 25 proceeds directly from step 178 to step 168. Following step 180, the node 25 goes to step 168 as noted above to determine if any additional nodes remain from the router advertisement.

In the case where the source node of the router advertisement (as determined from field 130) is the same as the node identified in the next hop field 40 of the routing table for the selected source/link address node as determined in step 160, the subject node 25 proceeds directly from step 160 to step 164. In such instance, the existing route for the selected source/link address node is replaced in the routing table 34 regardless of the advertised metric value. This is because the previous route may no longer exist. The node 25 then carries out steps 164 and 166 in the manner discussed above in order to update the entry in the routing table.

Referring to step 162, it may be the case that the modified metric for the selected source/link address node is not less than the metric in the existing routing table entry. Hence, the advertised route does not offer a lower cost alternative route. As a result, the node 25 proceeds from step 162 to step 188 in which the node 25 ignores the route information for the selected source/link address node. Following step 188, the node 25 proceeds to step 168 to determine if any other nodes remain from the router advertisement.

Referring again to step 154, the advertised metric of the selected source/link address node may be equal to infinity (as in the case of an invalid link). If so, the node 25 proceeds from step 154 to step 190. In step 190, the node 25 determines if the selected source/link address node already exists in the routing table 34. If not, the node 25 proceeds to step 168 where it discards the selected source/link address node as the route is invalid and determines if any nodes remain in the router advertisement. However, if the selected source/link address node does exist in the routing table as determined in step 190, the node 25 proceeds to step 192. In step 192, the node 25 determines if the source node of the router advertisement (as determined from field 130) is the same as the node identified in the next hop field 40 in the existing routing table entry for the selected source/link address node. If no, the node 25 proceeds directly from step 192 to step 168.

On the other hand, if source node of the router advertisement is the same as the next hop node as determined in step 192, the node 25 thereby knows that the existing route in the routing table for the selected source/link address node is no longer valid. Consequently, the node 25 proceeds to step 194 in which it changes the metric in field 42 of the existing entry to infinity. In addition, the route change flag in field 46 is set to "Y" to indicate that the route has changed. Following step 194, the node 25 continues to step 196 in which the route refresh routine mentioned in step 166 is carried out. Specifically, the timeout period in field 44 for the selected source/link address node is set in the routing table to be equal to a predetermined delete timeout period such as ROUTE_ADVER_TIME×2. From step 196, the node 25 proceeds to step 168 to determine if any additional nodes exist in the router advertisement which need to be processed in the manner described above.

Referring back to step 150, in the event the node 25 determines that the routing table update has not been initiated in response to a router advertisement the node 25 proceeds directly to step 200. The node 25 determines in step 200 whether the update has been initiated in response to a router solicitation (e.g., step 72 in FIG. 4). If the node 25 concludes that the routing table update has not been initiated in response to a router solicitation, an error occurs as shown in step 202. This is because in the exemplary embodiment a routing table update is intended to be performed only in response to a router advertisement or a router solicitation. In the event the update is in response to a router solicitation as determined in step 200, the node 25 proceeds to step 204 where it determines if the source node of the router solicitation already exists as an entry in its routing table 34. Specifically, the node 25 compares the node identified in field 130 of the router solicitation with the nodes identified in fields 38 of the routing table 34. If no, the node 25 proceeds to step 206 in which it adds the source node from field 130 as an entry in the routing table 34.

More specifically, the source node from field 130 is copied into a new field 38 in the routing table 34. The source node from field 130 also is copied into the corresponding next hop field 40 since the same node serves as a link to itself. The metric in field 42 is set to a predetermined minimum value, e.g., "1" representing the cost of one hop. The timeout period in field 44 is set to a predetermined value, e.g., ROUTE_ADVER_TIME×3. Finally, the route change flag in field 46 is set to "Y". Following step 206, the node 25 proceeds to step 170 where the routing table update is completed.

If in step 204 the node 25 determines that the source node already exists in the routing table 34, the node 25 proceeds to step 208 in which the metric for the existing entry in field 42 is compared with the predefined metric (e.g., "1") associated with a source node of a router solicitation. If the metric for the existing entry is equal to the predefined metric, the node ignores the new route information and proceeds to step 170. On the other hand, if the metric of the existing entry is less than or greater than the predefined metric, the node 25 proceeds to step 210 in which the existing entry is updated to include the new cost of the route. In particular, the next hop field 40 is set to include the source node itself. The metric in field 40 is set to the predefined metric (e.g., "1"). The timeout period in field 44 is set to ROUTE_ADVER_TIME×3, and the route change flag in field 46 is set to "Y". Following step 210, the node 25 proceeds to step 170 where the update of the routing table is completed.

Figure 12:
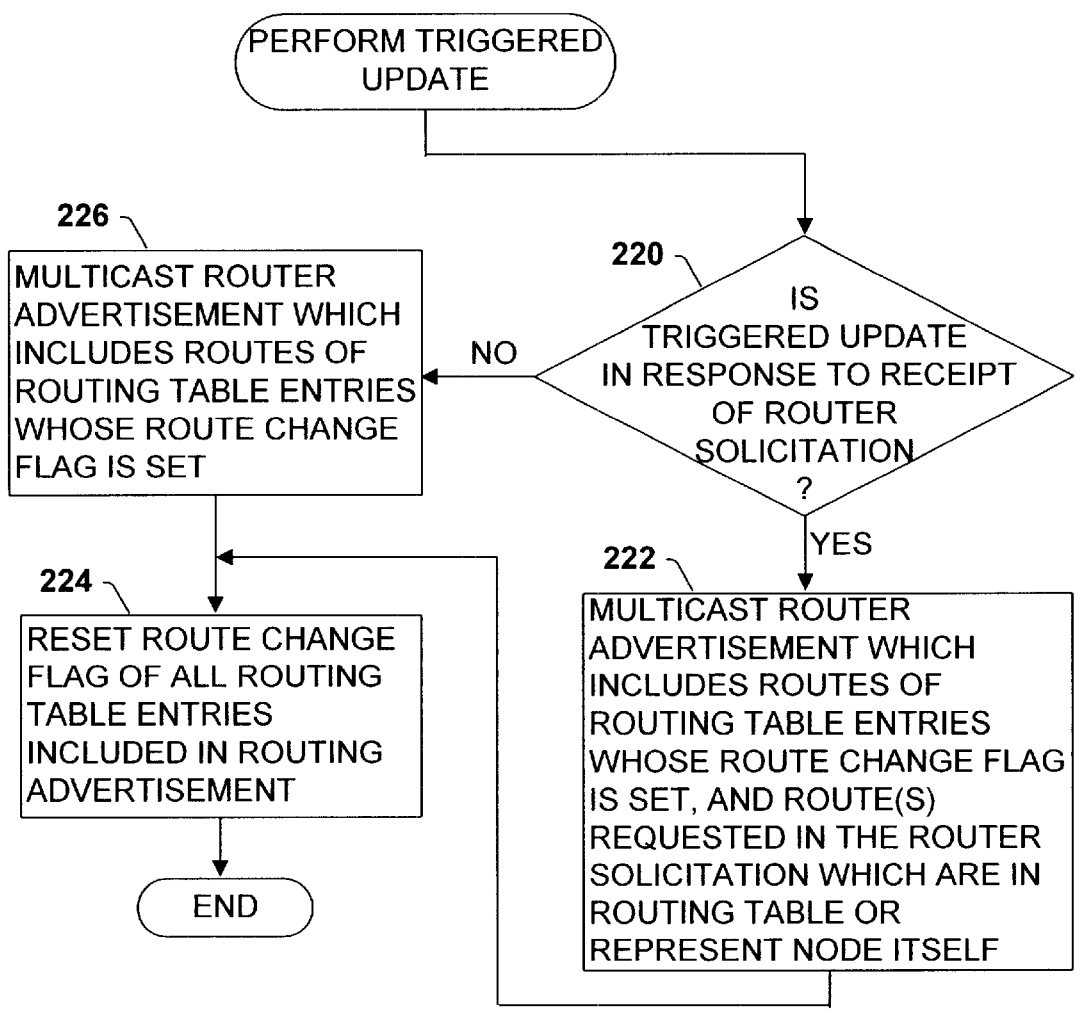
FIG. 12 is a flowchart illustrating a triggered update procedure carried out by each node to inform other nodes of changes in its routing table in accordance with the present invention.

Turning now to FIG. 12, the procedure by which each node 25 performs a triggered update is shown. Beginning in step 220, the node 25 determines if the triggered update is being performed in response to receipt of a router solicitation (i.e., step 78 in FIG. 4). If yes, the node 25 proceeds to step 222 in which it generates and multicasts a router advertisement. The router advertisement includes routes for those entries in its routing table 34 whose route change flag in field 46 is set to "Y", and any route(s) requested in the link address field 128 of the router solicitation for which there is an entry in the routing table 34 or which represent the node 25 itself. The specific procedure for generating the router advertisement is similar to steps 140–146 discussed above in connection with FIG. 10 as will be appreciated. However, rather than only including the routes solicited by the router solicitation, the router advertisement includes any other routes in its routing table 34 which have their route change flags set. Moreover, since the router advertisement is being multicast the unsolicited identifier in field 120 is also included in the router advertisement in step 222. In addition, the destination field 132 for the router advertisement is set to all "1's" to indicate a multicast. Following step 222, the node 25 proceeds to step 224 in which it resets all of the route change flags in field 46 of the routing table from "Y" to "N". After step 224, the triggered update is completed.

If in step 220 the node 25 determines that the triggered update is not in response to receipt of a router solicitation, the node 25 proceeds instead to step 226. In step 226 the node generates and multicasts a router advertisement which includes only those routes corresponding to entries in its routing table 34 which have their route change flag set to "Y". The router advertisement is generated in the same manner as in step 222 with the exception that the router advertisement does not include a solicited identifier in field 118 and the field is set to zero. Moreover, the link address field 124 includes only those entries whose route change flag is set. Following step 226, the node 25 proceeds to step 224 in which the route change flags for the respective entries are reset. From step 224 the triggered update is completed.

Figure 13:
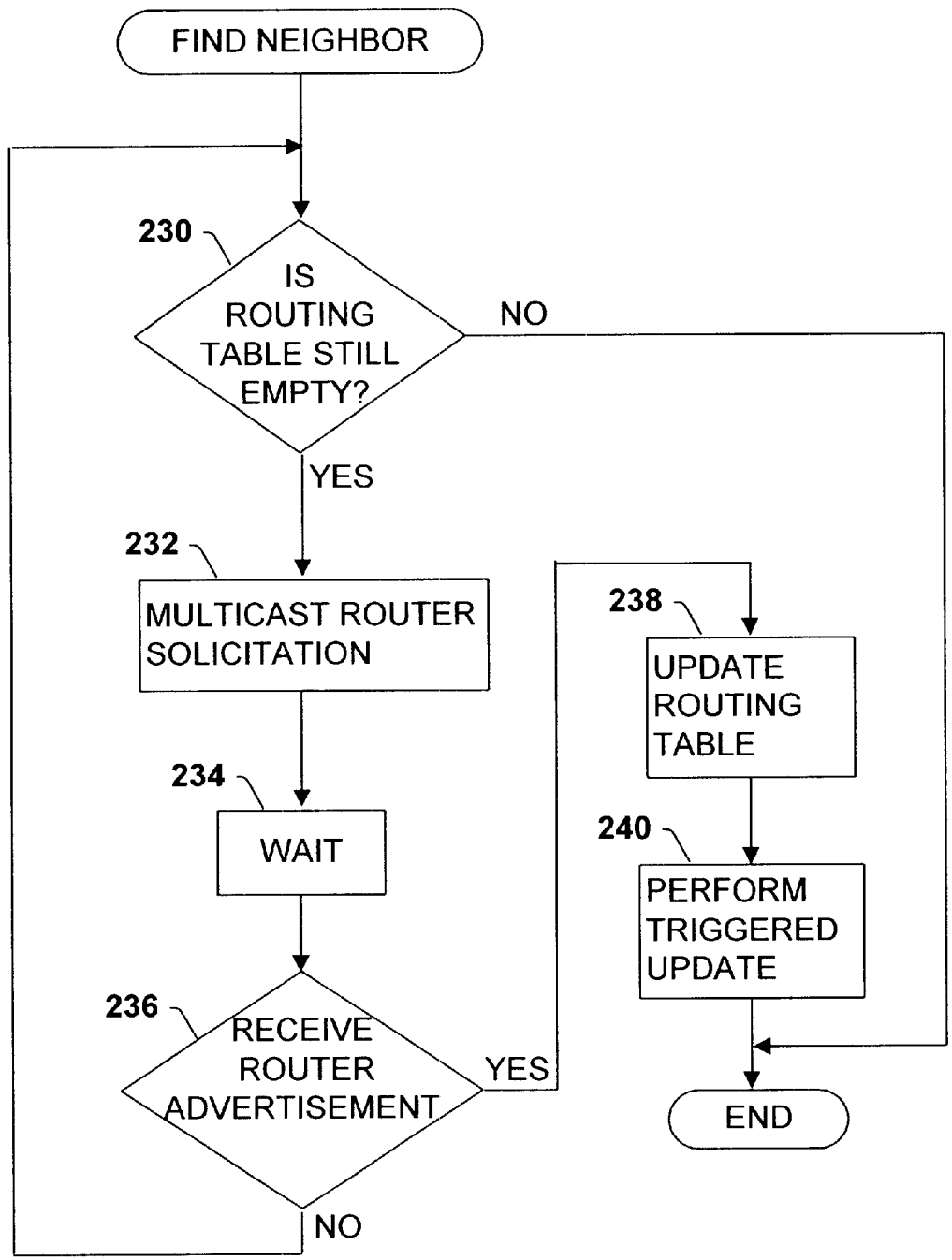
FIG. 13 is a flowchart representing a find neighbor routine in which each node solicits routing information from other nodes within a neighboring vicinity in accordance with the present invention.

FIG. 13 illustrates in detail the find neighbor routine carried out by each node 25 in step 94 (FIG. 4). Starting with step 230, the node 25 checks whether its routing table 34 is still empty. This is done in case a routing table entry was added since step 92 (FIG. 4) due to, for example, receipt of a router solicitation as exemplified in FIG. 5b above. Provided its routing table 34 remains empty, the node 25 proceeds to step 232 in which it generates and multicasts a router solicitation requesting all routes. Specifically, the node 25 forms a router solicitation packet of the type shown in FIG. 8. The source field 130 is set to include the node 25 which is transmitting the router solicitation. The destination field 132 is set to all "1's" to indicate a multicast. The ultimate source and destination fields 134 and 136 are not used as previously indicated. The type field 112 is set to indicate that the packet relates to routing protocol. The code field 114 is set to indicate that the packet is a router solicitation, and the version field 116 is set to include the proper version information. The solicited identifier field 118 is completed with the incremented solicited identifier value which identifies the particular router solicitation. The number of routes field 126 is set to zero to indicate to all receiving nodes 25 that all available routes from their respective routing tables are requested. The link address field 128 is excluded as the node 25 seeks any and all routes rather than specific route(s).

Upon transmitting the router solicitation in step 232, the node 25 proceeds to step 234 in which it waits a predetermined period (e.g., 5 seconds) to receive any router advertisements in response to its solicitation. In step 236, the node determines if it has received any router advertisements. If yes, the node 25 proceeds to step 238 in which it updates its routing table in the manner described above in connection with FIG. 11a–11e Following step 238, the node 25 performs a triggered update in step 240 with respect to each router advertisement in the manner described above in relation to FIG. 12. In this way, the node 25 is able to add one or more entries to its routing table 34 and the find neighbor procedure is completed.

If in step 236 the node 25 determines that it has not received a router advertisement, the node 25 returns to step 230 in which it checks if its routing table 34 remains empty. If no, indicating that an entry was added as a result of the node receiving a router solicitation, for example, the node 25 completes the find neighbor procedure as shown. Otherwise, if the routing table 34 is still empty the above-described process is repeated until such time as one or more routes are added to the routing table 34. Preferably, step 232 is repeated every ROUTE_ADVER_TIME seconds until such time as one or more entries exist in the routing table.

Figure 14:
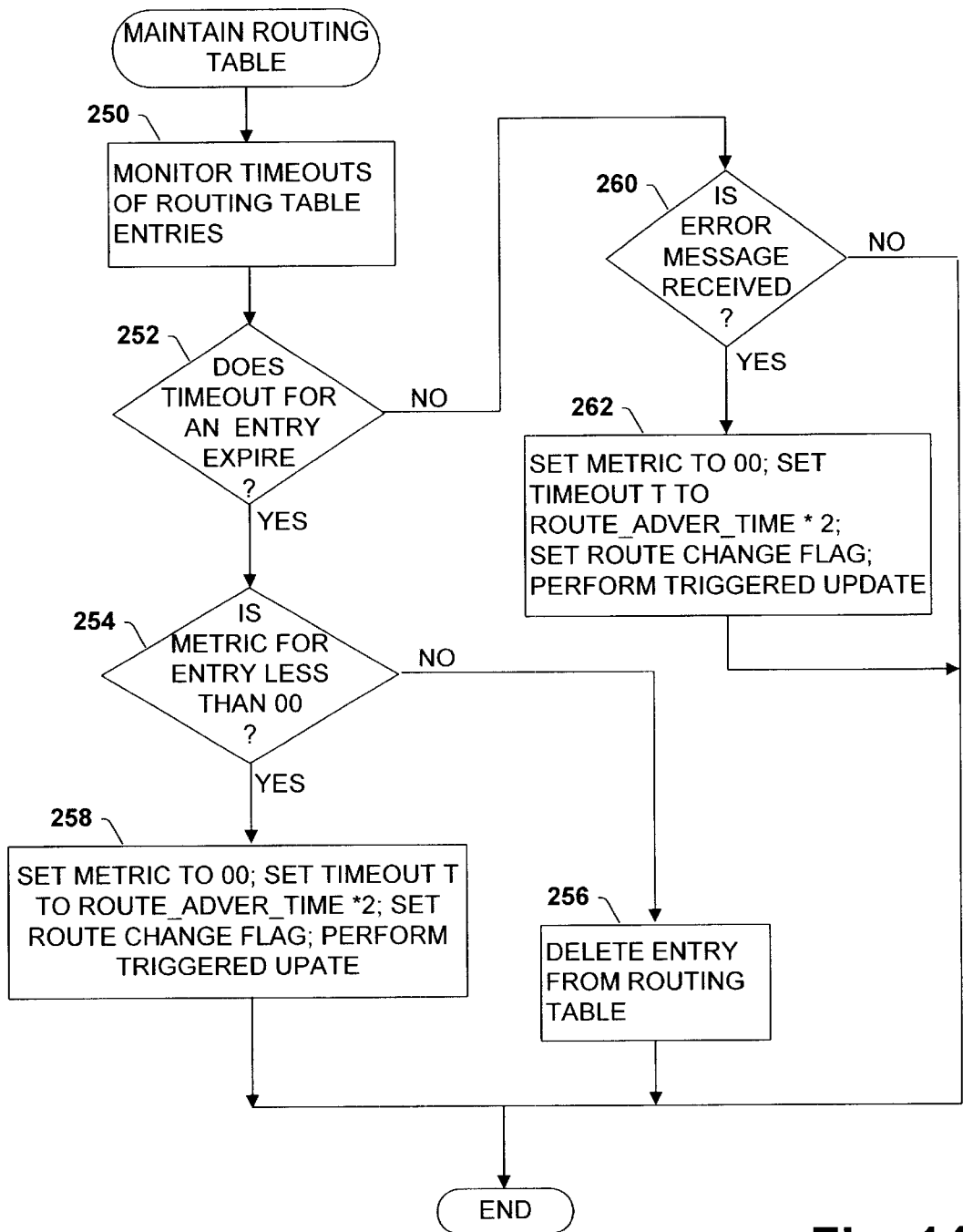
FIG. 14 is flowchart describing the process in which each node in the network maintains the routing information in its routing table in accordance with the present invention.

FIG. 14 illustrates the procedure by which a node 25 maintains its routing table as represented in step 90 of FIG. 4. Although the procedure is shown as a single step in FIG. 4, it will be appreciated that the procedure is carried out substantially continuously by the node 25. Specifically, in step 250 the node 25 monitors the timeout periods in field 44 for each of the respective entries in its routing table 34. Upon being set, the timeout periods in field 44 for each of the entries continues to run as determined by a clock (not shown) included in the node 25. The timeout periods run down until such time as they are reset or expire. In step 250 the node 25 continues to monitor the respective timeout periods. Next, in step 252 the node 25 determines if any of the timeout periods have expired. If yes, the node 25 proceeds to step 254 where it checks whether the metric for any entry which has expired is less than infinity. If no, that indicates that the expired entry has already been identified as representing an invalid route. Hence, the node 25 proceeds to step 256 in which the entry is deleted from the routing table 34. If in step 254 the metric for an expired entry is less than infinity, this indicates that the particular entry only recently has become invalid. As a result, rather than immediately clearing the entry from the routing table 34 the node 25 proceeds to step 258 in which the metric for the expired entry is set to infinity together with the metrics for any entries in which the expired entry is identified in the next hop field 40. In addition, the timeout period in field 44 for the expired entry and any other entries in which the expired entry is identified in the next hop field 40 is reset to a delete timeout period of ROUTE_ADVER_TIME×2; and the route change flags in field 46 is set to "Y". Thereafter, the node 25 performs a triggered update to inform its neighbors of the changes in its routing table.

If in step 252 the node 25 determines that none of the timeout periods have expired, it proceeds to step 260 in which it determines if an error message has been received in connection with the transmission of data packets as discussed below in relation to FIGS. 15a–15b. Such error messages indicate that a data packet was sent unsuccessfully to a node according to a route included in the routing table 34. If such an error message is received as determined in step 260, the node 25 proceeds to step 262. In step 262, the metric for the node to which the data packet was unsuccessfully directed is set to infinity together with the metrics for any entries which have the node to which the packet was directed in their next hop field 40. In addition, the timeout period in field 44 is set to ROUTE_ADVER_TIME×2; and the route change flag in field 46 is set to "Y" for the respective nodes. Thereafter, the node 25 performs a triggered update to inform its neighbors of the changes in its routing table. The process in FIG. 14 is continuously repeated in effect such that the information in the routing table 34 remains current.

Figure 15A:
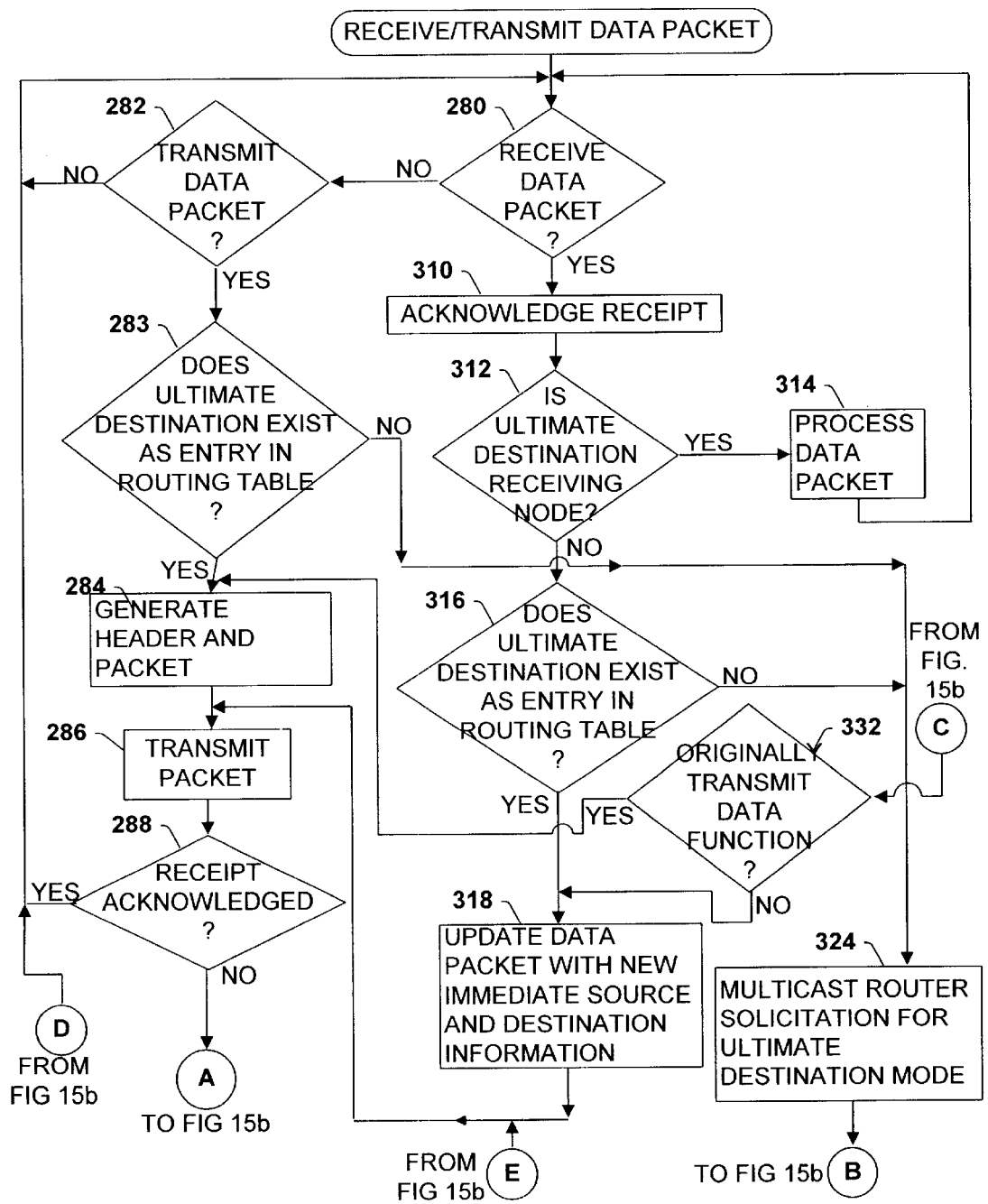
FIGS. 15a–15b is a flowchart representing the procedure whereby each node transmits and receives data packets in accordance with the present invention.
Figure 15B:
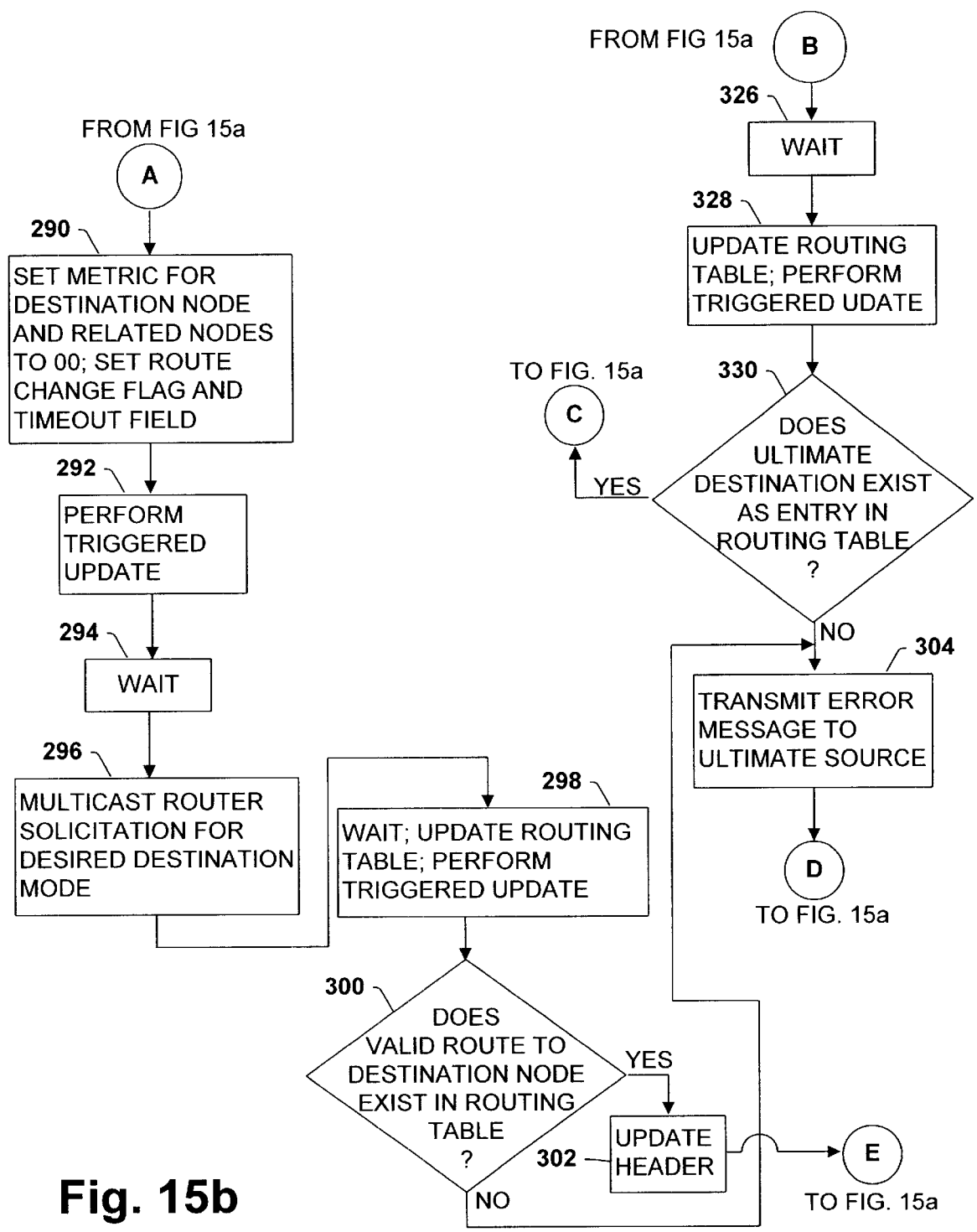

FIGS. 15a–15b relates to the receipt/transmission of data packets as carried out by each node 25 (step 100 of FIG. 4). Data packets include a standard header 110 as represented in FIG. 9 together with a data field (not shown). Beginning in step 280, the node 25 determines if a data packet has been received by the node. If no, the node 25 proceeds to step 282 in which it determines if the node 25 needs to transmit a data packet (e.g., as part of its normal operations). If no, the node 25 returns to step 280. If yes, the node 25 proceeds to step 283 in which it determines whether route information for the node to which the packet is ultimately destined exists in its routing table 34. If not, the node 25 proceeds to steps 324 through 330 as discussed below in order to solicit routing information for the ultimate destination node from its neighboring nodes. Otherwise, the node 25 proceeds from step 283 to step 284 in which it generates a packet including a header 110.

More particularly, in step 284 the source field 130 and the ultimate source field 134 are set to contain the address of the subject node 25 itself. The destination field 132 is set to include the node identified in the next hop field 40 of the entry corresponding to the ultimate destination node in the routing table 34. The ultimate destination node 136 is set to include the address of the node to which the packet is ultimately directed. The data field (not shown) is completed with the appropriate data which is desired to be transmitted. Following step 284, the subject node 25 transmits the thus formed data packet in step 286. Next, in step 288 the node 25 determines if a receipt acknowledgment has been received indicating that the packet was successfully received by the node identified as being the next hop in field 132. Specifically, each of the nodes 25 are configured to transmit a receipt acknowledgment according to conventional techniques so as to indicate to the source node whether a data packet was received. If a receipt acknowledgment is received in step 288, the subject node 25 returns to step 280.

If in step 288 a receipt acknowledgment is not received indicating a broken communication link between the subject node 25 and the destination node identified in field 132, the subject node 25 proceeds to step 290. In step 290, the node 25 sets the metric in its routing table 34 for the entry corresponding to the destination node in field 132 to infinity. It is noted that since the destination node in field 132 serves as a next hop node for the ultimate destination node in field 136 based on the routing table 34, the routing table 34 will necessarily include an entry for the node identified in field 132 since such node will have served as the basis for the route information (see, e.g., FIGS. 11a–11e). Furthermore, the subject node 25 sets the metrics to infinity for any other "related" entries in its routing table 34 which have the destination node identified in field 132 as the next hop in field 40 of its routing table 34. In the event the ultimate destination node in field 136 is different from the destination node in field 132, the subject node 25 in step 290 also sets the metric for the entry corresponding to the ultimate destination node to infinity. In addition, in step 290 the node 25 sets the route change flag(s) in field 46 to "Y" and sets the timeout period(s) in field 44 to ROUTE_ADVER_TIME×2 for the respective entry(ies) which have been changed.

Next, in step 292 the node 25 carries out a triggered update as described above in order to inform its neighbors of the recently discovered invalid communication links. The subject node 25 then waits a predetermined amount of time in step 294 to allow the triggered updates to cascade through the network. This is to avoid having a neighbor falsely advertise that it can reach the desired node via the node where the link had just failed. Such time can be on the order of 10 seconds, for example. Following step 294, the subject node 25 proceeds to step 296 in which it multicasts a router solicitation in an attempt to learn of a possible new route(s) to the desired destination node(s). Specifically, the node 25 identifies in the link address field 128 the particular nodes for which the metric in its routing table were set to infinity in step 290. The router solicitation is multicasted in step 296 and in step 298 the node 25 waits to receive router advertisements in response to the solicitation. Provided any router advertisements are received indicating alternate route(s), the node 25 updates its routing table and performs a triggered update in step 298 in the manner described above.

Following step 298, the node 25 proceeds to step 300 in which it determines if a valid route to-the desired ultimate destination node exists in its routing table 34. If yes, the node 25 updates the header information in step 302 to indicate the new next hop node in field 132. The node 25 then returns to step 286 where it retransmits the data packet and the above-described procedure is repeated. If a valid route to the ultimate destination node does not exist as determined in step 300, the node 25 goes to step 304. In step 304 the node 25 transmits an error message directed to the ultimate source node identified in field 134 of the data packet indicating that it was unable to deliver the data packet. In the case where the subject node 25 is the ultimate source node (i.e., the transmit data originates from the subject node 25 ("Yes" in step 282)), such step is unnecessary as will be appreciated. In the case where the subject node 25 is serving as an intermediate node (as described below) for purposes of forwarding a data packet, such error message is transmitted in step 304 to the ultimate source node. The ultimate source node then uses such error message to update its routing table in relation to the invalid link (steps 260, 262 in FIG. 14).

Referring back to step 280, if it is determined by the node 25 that a data packet has been received, the node 25 proceeds to step 310. The node 25 in step 310 generates and transmits a receipt acknowledgment to the node identified as the immediate source in field 130 of the data packet. Next, in step 312 the node 25 determines if the node 25 itself is the ultimate destination node for the data packet as identified in field 136. If yes, the data packet is intended for the subject node 25 and the node proceeds to step. 314 in which it processes the data in the packet for its intended purpose (e.g., inventory tracking, etc.). Otherwise, the node 25 proceeds from step 312 to step 316 in which it determines if the ultimate destination node in field 136 exists as an entry in its routing table 34. If yes, the node 25 proceeds to step 318 in which it simply updates the data packet by inserting into the destination field 132 the next hop node associated with the ultimate destination node from the routing table in field 40. In addition, the node 25 identifies itself in the source field 130. Following step 318, the node 25 goes to step 286 where the revised data packet is transmitted in accordance with the steps. previously described above. Thus, the data packet is forwarded by the subject node 25.

If in step 316 the ultimate destination node identified in field 136 of the received data packet does not exist in the routing table, the node 25 proceeds to step 324. Similarly, if in step 283 the ultimate destination node does not exist in the subject node's routing table the node 25 proceeds to step 324. In step 324, the node 25 generates and multicasts a router solicitation in step 324 seeking routes to the ultimate destination node. The node 25 then waits in step 326 for a predetermined period of time (e.g., 5 seconds) to receive any router advertisements which result from the router solicitation. Next, in step 328 the node 25 updates its routing table and performs a triggered update if appropriate based on any router advertisements which were received. The node 25 then goes to step 330 in which it determines if the ultimate destination node represented in field 136 of the data packet now exists in the routing table 34. If not, the node 25 proceeds to step 304 in which it transmits an error message to the ultimate source node (unless the node 25 is itself the ultimate source node) to inform the ultimate source node that the node 25 was unable to forward/transmit the packet. In the event the ultimate destination node 25 does now exist in the routing table as determined in step 330, the node 25 proceeds to step 332 in which it determines whether the routing information recently obtained in steps 324–330 was based originally on a transmit data function ("No" in step 283) or a receive data function ("No" in step 316). If based originally on a receive data function, the node proceeds to step 31 8 in which it updates the data packet to be forwarded in the manner described above in order that it can be forwarded to the next hop along the communication link. If in step 332 it is determined the recently obtained routing information was acquired in connection with an original transmit function, the node 25 then proceeds to step 284 where it goes about generating the packet to be sent with the appropriate header information and the data to be transmitted.

It will be appreciated that the steps described above in relation to the receipt of data are carried out substantially continuously. On the other hand, those steps relating to the transmission of data are carried out primarily only when the node wishes to transmit a packet. The receipt and transmission of data has been combined into one flowchart only for sake of simplicity, and can in fact be represented by separate routines.

Figure 16:
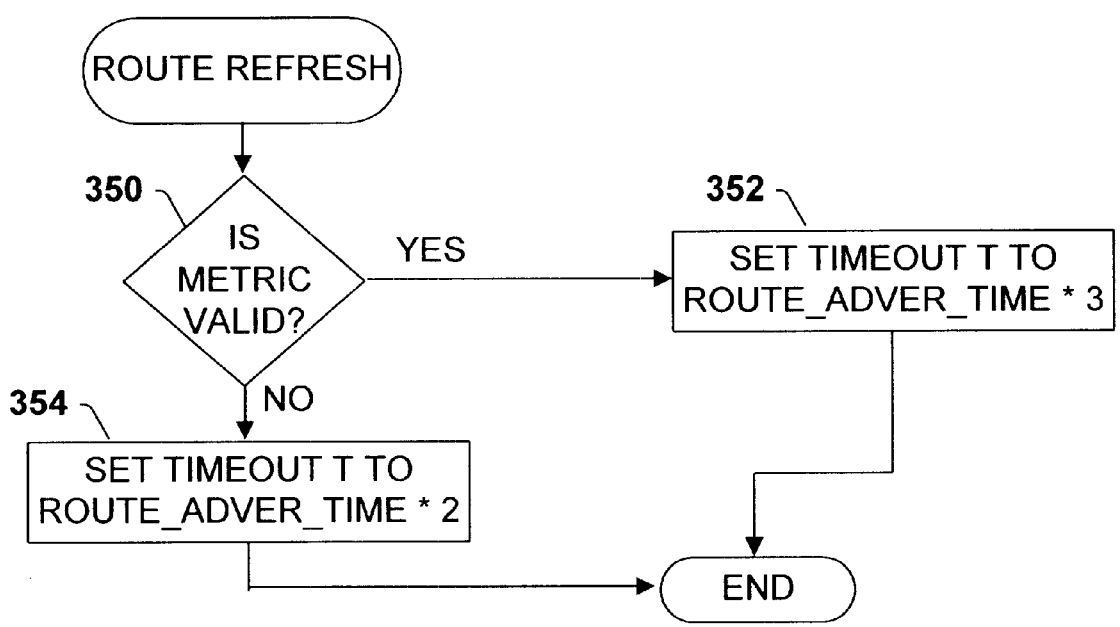
FIG. 16 is a flowchart illustrating the manner in which each node refreshes routing information in its routing table in accordance with the present invention.

Referring briefly to FIG. 16, the process by which routes are refreshed (e.g., steps 166, 196 in FIGS. 11a–11b is shown. Beginning in step 350, the node 25 checks whether the route being refreshed has a metric which is valid (i.e., less than infinity). If yes, the timeout period for the particular entry is set to ROUTE_ADVER_TIME×3 as represented in step 352. On the other hand, if the metric is invalid (i.e., infinity or greater), the timeout period in field 44 is set to ROUTE_ADVER_TIME×2 as shown in step 354.

Figure 17:
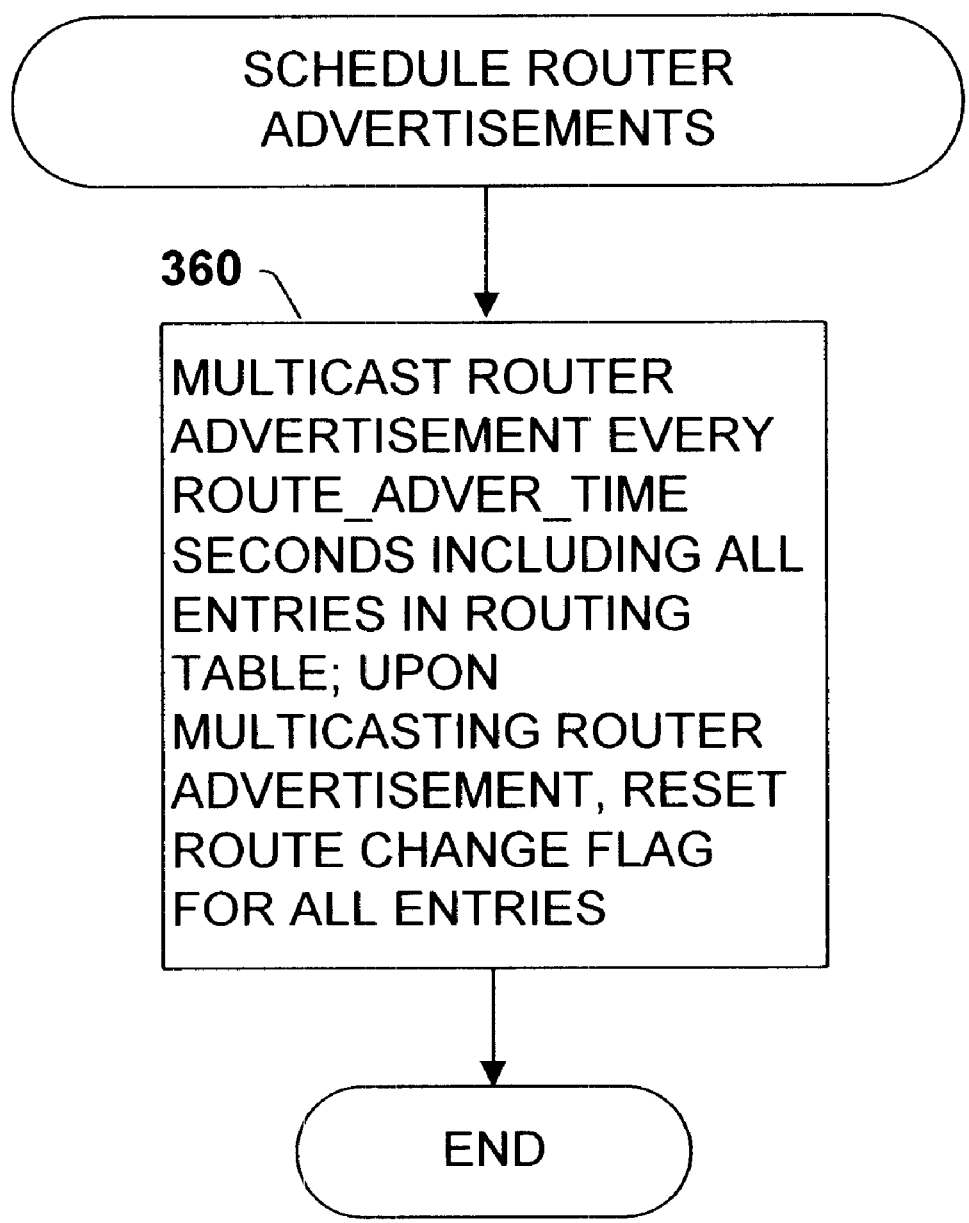
FIG. 17 is a flowchart representing a procedure in which a router advertisement is transmitted periodically by each node in the network in accordance with the present invention.

Turning to FIG. 17, the routine for sending scheduled router advertisements (step 93 in FIG. 4) is shown. Basically, during such times that the routing table 34 of a node is not empty, the node 25 is programmed to multicast router advertisements every ROUTE_ADVER_TIME seconds (e.g., 10 seconds). Such router advertisements, as represented in step 360, include routes for all valid entries in the routing table regardless of whether the corresponding route change flag is set. Upon the transmission of each router advertisement, the route change flag for each of the entries is reset to "N".

Figure 18:
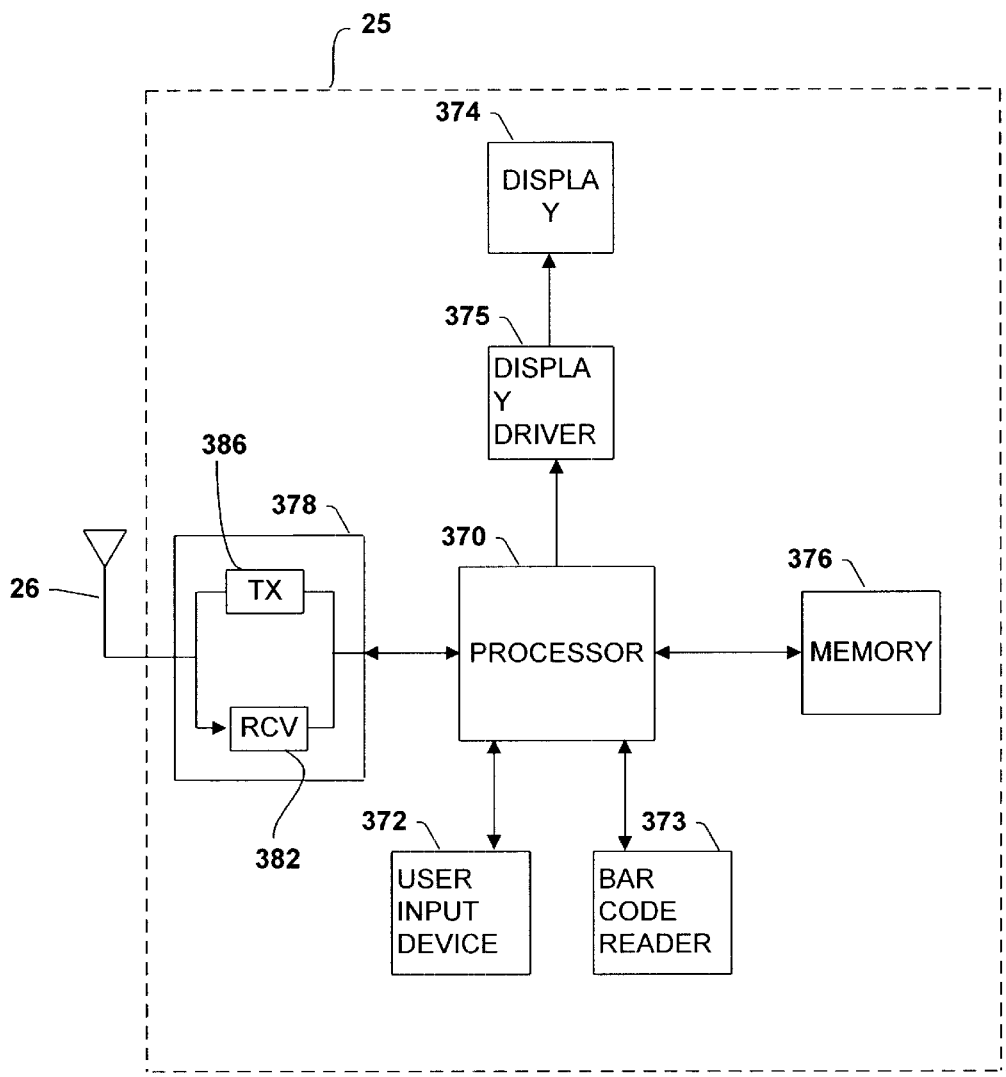
FIG. 18 is a block diagram of an exemplary mobile node in accordance with the present invention.

Referring now to FIG. 18, a block diagram is shown of an exemplary mobile node 25 (e.g., nodes 25A and 25B in FIG. 1) in accordance with the described embodiment. Each mobile node 25 includes a processor 370 which can be programmed to control and to operate the various components within the mobile node 25 in order to carry out the various steps and functions described herein. The processor 370 is coupled to an operator input device 372 which allows an operator to input data to be communicated to another node such as inventory data, patient information, etc. This information may be sent ultimately to the host computer 30 (FIG. 1) which serves as a central data location, for example. The input device 372 can include such items as a keypad, touch sensitive display, etc. The mobile node 25 also may include a bar code scanner 373 coupled to the processor 370 for providing another form of data input. A display 374 is also connected to and controlled by the processor 370 via a display driver circuit 375. The display 374 serves as a means for displaying information stored within the mobile node 25. The display 374 can be a flat panel liquid crystal display with alphanumeric capabilities, for example, or any other type of display as will be appreciated.

A memory 376 is included in each mobile node 25 for storing program code executed by the processor 370 for carrying out the functions described herein. The actual code for performing such functions could be easily programmed by a person having ordinary skill in the art of computer programming in any of a number of conventional programming languages based on the disclosure herein. Consequently, further detail as to the particular code has been omitted for sake of brevity. The memory 376 also serves as a storage medium for storing packets received from or intended to be transmitted to other nodes 25 as discussed herein. Moreover, the memory 376 serves as a storage location for storing the routing table 34 corresponding to the node 25.

Each mobile node also includes its own RF section 378 connected to the processor 170. The RF section 378 includes an RF receiver 382 which receives RF transmissions (e.g., router advertisements, router solicitations, data packets, etc.) from other nodes via its antenna 26 and demodulates the signal to obtain the digital information modulated therein. An example of a suitable RF receiver 382 for use in the mobile node 25 is the Model O25 Direct Sequence Spread Spectrum Radio Module, which is commercially available from Aironet Wireless Communications, Inc. of Akron, Ohio.

The RF section 378 also includes an RF transmitter 386. In the event the mobile node 25 is to transmit a router advertisement, router solicitation or data packet, etc., the processor 370 forms within the memory 376 an appropriated packet in the manner described above. The packet is then delivered to the RF transmitter 386 which transmits an RF signal with the packet modulated thereon via the antenna 26 according to conventional techniques.

A fixed node 25 (e.g., nodes 25D and 25E in FIG. 1) is similar to the mobile node 25 shown in FIG. 17, but may include a hardwired connection to the system backbone 27 for example. Also, depending on what extent the fixed node 25 is to be used for allowing user input versus simply serving to route data packets, the fixed node 25 may omit the display, bar code scanner, etc. In the case of the fixed node 25F, for example, there is no connection to the system backbone 27.

Thus, the present invention provides a network in which the nodes themselves are the routers of data packets. The nodes advertise a list of nodes which are reachable through their interface(s). When a node receives a data packet for which it is not the ultimate destination, it looks up the next hop link address from its list of reachable nodes, and forwards the data packet to that address.

Although the invention has been shown and described with respect to certain preferred embodiments, it is obvious that equivalents and modifications will occur to others skilled in the art upon the reading and understanding of the specification. For example, although a radio connection between nodes is utilized it will be appreciated that other wireless means such as optical, infrared, etc. are also possible. Furthermore, although the flowcharts presented above illustrate multiple steps for ease of understanding, it will be appreciated that many otherwise redundant steps can be consolidated without departing from the scope of the invention. The present invention includes all such equivalents and modifications, and is limited only by the scope of the following claims.

What is claimed is:

1. In a wireless network having a plurality of nodes which roam about the network, a method for routing data among the nodes whereby at least one node carries out the steps of:

maintaining a list of nodes which are reachable through the at least one node based on communication received from other nodes;

when receiving data for which the node is not the ultimate destination, attempting to forward the data towards the ultimate destination based on the list of nodes;

transmitting a router solicitation requesting the other nodes to communicate at least a portion of their respective list of nodes to the at least one node in the event there are less than a predetermined number of nodes listed in the at least one node's list of nodes, the router solicitation identifying which node or nodes information is requested; and upon receiving the router solicitation from the at least one node, the other nodes performing a triggered update which causes the other nodes to transmit a router advertisement to neighboring nodes, the router advertisement only including routing information for nodes whose routing information has changed since a last router advertisement and for those nodes requested in the router solicitation.

2. The method of claim 1, wherein the communication received from other nodes is an advertisement.

3. The method of claim 1, further comprising the step of communicating to other nodes at least a portion of the list of nodes which are reachable through the node.

4. The method of claim 3, wherein the list of nodes includes information relating to a next hop link address for forwarding data packets to a corresponding node.

5. The method of claim 4, wherein in the case where multiple possible next hop link addresses exist for a corresponding node, each node selects the next hcp link address which has a minimum cost according to a predefined criteria.

6. The method of claim 3, wherein the step of communicating to other nodes occurs at scheduled update intervals.

7. In a wireless network having a plurality of nodes which roam about the network, a method for routing data packets among the nodes whereby each of the nodes carries out the steps of:

maintaining a list of nodes which are reachable through the node based on advertisements received from other nodes;

advertising to other nodes the list of nodes which are reachable through the node;

when receiving a data packet for which the node is not the ultimate destination, forwarding the data packet towards the ultimate destination based on the list of nodes;

transmitting a router solicitation requesting the other nodes to communicate at least a portion of their respective list of nodes to the node in the event there are less than a predetermined number of nodes listed in the node's list of nodes, the router solicitation identifying which node or nodes information is requested; and upon receiving the router solicitation from the node, the other nodes performing a triggered update which causes the other nodes to transmit a router advertisement to neighboring nodes, the router advertisement only including routing information for nodes whose routing information has changed since a last router advertisement and for those nodes requested in the router solicitation.

8. The method of claim 7, wherein the list of nodes includes information relating to a next hop link address for forwarding data packets to a corresponding node.

9. The method of claim 8, wherein in the case where multiple possible next hop link addresses exist for a corresponding node, each node selects the next hop link address which has a minimum cost according to a predefined criteria.

10. A method of communicating routing information in a cellular communication system, the method comprising the steps of:

receiving at a first mobile node communication from a second mobile node operating within direct communication range;

adding the second mobile node to a routing table maintained by the first mobile node;

transmitting from the first mobile node, for receipt by at least one other mobile node which may be operating within direct communication range of the first mobile node, at least a portion of the routing table including information related to the second mobile node;

transmitting a router solicitation requesting the at least one other mobile node to communicate at least a portion of the at least one other mobile node's list of nodes to the first mobile node in the event there are less than a predetermined number of nodes listed in the first mobile node's list of nodes, the router solicitation identifying which node or nodes information is requested; and upon receiving the router solicitation from the first mobile node, the at least one other mobile node performing a triggered update which causes the at least one other mobile node to transmit a router advertisement to neighboring nodes, the router advertisement only including routing information for nodes whose routing information has changed since a last router advertisement and for those nodes requested in the router solicitation.

11. The method of claim 10, further comprising the steps of:

receiving the at least a portion of the routing table by at least one other mobile node operating within direct communication range of the first mobile node; and updating a routing table maintained by the at least one other mobile node with the at least a portion of the routing table received.

12. The method of claim 11, further comprising steps of:

detecting at the first mobile node that the second mobile node is no longer within direct communication range; and transmitting from the first mobile node, for receipt by at least one other mobile node which may be operating within direct communication range of the first mobile node, information indicating that the second mobile node is no longer within direct communication range of the first mobile node.

13. The method of claim 12, further comprising the steps of:

receiving the information by at least one other mobile node operating within direct communication range of the first mobile node; and updating a routing table maintained by the at least one other mobile node with the information received.

14. The method of claim 10, wherein said routing table includes a list of nodes and information relating to a next hop link address for forwarding data packets to a corresponding node.

15. A wireless network, comprising:

a plurality of nodes which roam about the network, wherein each of the nodes serves as a router for packets of information which are communicated among the nodes and wherein a node transmits a router solicitation requesting the other nodes to communicate at least a portion of their respective list of nodes to the node in the event there are less than a predetermined number of nodes listed in the node's list of nodes, the router solicitation identifying which node or nodes information is requested, and upon receiving the router solicitation from the node, the other nodes perform a triggered update which causes the other nodes to transmit a router advertisement to neighboring nodes, the router advertisement only including routing information for nodes whose routing information has changed since a last router advertisement and for those nodes requested in the router solicitation.

16. The network of claim 15, wherein each node maintains a list of nodes which are reachable through the node based on advertisements received from other nodes; advertises to other nodes the list of nodes which are reachable through the node; and when receiving data for which the node is not the ultimate destination, forwards the data towards the ultimate destination based on the list of nodes.

17. The network of claim 16, wherein each node comprises a memory which has stored therein the list of nodes.

18. The network of claim 17, wherein the list of nodes includes information relating to a next hop link address for forwarding data to a corresponding node.

19. A mobile node capable of routing information in a wireless communication system, the mobile node comprising:

wireless communication means for communicating information between the mobile node and any other reachable node;

means for maintaining a list of nodes which are reachable through the mobile node based on communication wirelessly received from the other nodes;

means for attempting to wirelessly forward data received towards the ultimate destination based on the list of nodes when the mobile node is not the ultimate destination for the data received;

means for transmitting a router solicitation requesting the other nodes to communicate at least a portion of their respective list of nodes to the mobile node in the event there are less than a predetermined number of nodes listed in the mobile node's list of nodes, the router solicitation identifying which node or nodes information is requested; and upon receiving the router solicitation from the mobile node, means for performing a triggered update which causes the other nodes to transmit a router advertisement to neighboring nodes, the router advertisement only including routing information for nodes whose routing information has changed since a last router advertisement and for those nodes requested in the router solicitation.

20. The mobile node of claim 19, wherein the communication received from other nodes is an advertisement.

21. The mobile node of claim 19, further comprising means for communicating to other nodes at least a portion of the list of nodes which are reachable though the mobile node.

22. The mobile node of claim 21, wherein the list of nodes includes information relating to a next hop link address for forwarding data packets to a corresponding node.

23. The mobile node of claim 22, wherein in the case where multiple possible next hop link addresses exist for a corresponding node, each node selects the next hop link address which has a minimum cost according to a predefined criteria.

24. The mobile node of claim 21, wherein the at least portion of the list of nodes is communicated to other nodes at scheduled update intervals.

25. The mobile node of claim 19, wherein in the even there are less than a predetermined number of nodes listed in the list of nodes, the node transmits a router solicitation requesting other nodes to communicate at least a portion of their respective list of nodes to the node.

26. A network communication system comprising:

a backbone;

a plurality of base stations coupled to the backbone;

a plurality of mobile nodes communicating with the backbone via the base stations;

wherein at least one of the mobile nodes includes:

wireless communication means for communicating information between the mobile node and any other reachable node;

means for maintaining a list of nodes which are reachable through the mobile node based on communication wirelessly received from other nodes;

means for attempting to wirelessly forward data received towards the ultimate destination based on the list of nodes when the mobile node is not the ultimate destination for the data received;

means for transmitting a router solicitation requesting the other nodes to communicate at least a portion of their respective list of nodes to the mobile node in the event there are less than a predetermined number of nodes listed in the mobile node's list of nodes, the router solicitation identifying which node or nodes information is requested; and upon receiving the router solicitation from the mobile node, means for performing a triggered update which causes the other nodes to transmit a router advertisement to neighboring nodes, the router advertisement only including routing information for nodes whose routing information has changed since a last router advertisement and for those nodes requested in the router solicitation.

27. The system of claim 26, wherein the communication received from the other nodes is an advertisement.

28. The system of claim 26, wherein in the event there are less than a predetermined number of nodes listed in the list of nodes, the mobile node transmits a router solicitation requesting other nodes to communicate at least a portion of their respective list of nodes to the node.

29. The system of claim 26, wherein the mobile node further includes means for communicating to other nodes at least a portion of the list of nodes which are reachable through the mobile node.

30. The system of claim 24, wherein the list of nodes includes information relating to a next hop link address for forwarding data packets to a corresponding node.

31. The system of claim 30, wherein in the case where multiple possible next hop link addresses exist for a corresponding node, each node selects the next hop link address which has a minimum cost according to a predefined criteria.

32. The system of claim 29, wherein the at least a portion of the list of nodes is communicated to other nodes at scheduled update intervals.

33. In a wireless network having a plurality of nodes which roam about the network, a method for routing data among the nodes whereby at least one node carries out the steps of:

maintaining a list of nodes which are reachable through the node based on communication received from other nodes;

communicating to other nodes at least a portion of the list of nodes which are reachable through the node each time there is a change in the list of nodes determined to be reachable through the node;

transmitting a router solicitation requesting the other nodes to communicate at least a portion of their respective list of nodes to the node in the event there are less than a predetermined number of nodes listed in the node's list of nodes, wherein the at least a portion of the list of nodes is communicated to other nodes as a result of a triggered update, the router solicitation identifying which node or nodes information is requested; and upon receiving the router solicitation from the node, the other nodes performing a triggered update which causes the other nodes to transmit a router advertisement to neighboring nodes, the router advertisement only including routing information for nodes whose routing information has changed since a last router advertisement and for those nodes requested in the router solicitation.

34. The method of claim 32, wherein the at least a portion of the list of nodes includes information regarding the change in the list of nodes determined to be reachable through the node.

* * * * *